US012032328B2

(12) United States Patent
Kitajima

(10) Patent No.: US 12,032,328 B2
(45) Date of Patent: Jul. 9, 2024

(54) IMAGE FORMING APPARATUS HAVING IMPROVED ACCESS TO DRIVE UNIT

(71) Applicant: CANON KABUSHIKI KAISHA, Tokyo (JP)

(72) Inventor: Tomoharu Kitajima, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/159,287

(22) Filed: Jan. 25, 2023

(65) Prior Publication Data

US 2023/0244180 A1 Aug. 3, 2023

(30) Foreign Application Priority Data

Jan. 31, 2022 (JP) ................................. 2022-012865

(51) Int. Cl.

*G03G 21/16* (2006.01)
*G03G 15/00* (2006.01)

(52) U.S. Cl.

CPC ......... *G03G 21/1671* (2013.01); *G03G 15/80* (2013.01); *G03G 21/1619* (2013.01); *G03G 21/1633* (2013.01); *G03G 21/1652* (2013.01)

(58) Field of Classification Search

CPC ............... G03G 15/80; G03G 21/1619; G03G 21/1633; G03G 21/1647; G03G 21/1652; G03G 21/1671

See application file for complete search history.

(56) References Cited

U.S. PATENT DOCUMENTS

2015/0003857 A1* 1/2015 Katamoto .......... G03G 21/1652 399/90
2021/0389716 A1* 12/2021 Kitajima ............ G03G 21/1647

FOREIGN PATENT DOCUMENTS

JP 2005215199 A 8/2005

* cited by examiner

*Primary Examiner* — Sophia S Chen
(74) *Attorney, Agent, or Firm* — ROSSI, KIMMS & McDOWELL LLP

(57) ABSTRACT

An image forming apparatus that forms an image on a recording material includes a frame body, an image forming unit, a first electric component unit, a first electric component board, a second electric component unit, and a second electric component board. The second electric component board communicates with the first electric component board and controls the image forming unit. The first electric component unit pivots about a first pivot axis positioned on a first side in a width direction. The second electric component unit pivots about a second pivot axis positioned on a second side in the width direction. When the first electric component unit and the second electric component unit are in closed states, the second electric component unit is positioned between the first electric component unit and the image forming unit in a front-back direction of the image forming apparatus.

12 Claims, 19 Drawing Sheets

IMAGE FORMING APPARATUS HAVING IMPROVED ACCESS TO DRIVE UNIT

BACKGROUND OF THE INVENTION

Field of the Invention

The present invention relates to image forming apparatuses, such as a printer, a copying machine, a facsimile, or a multifunction machine.

Description of the Related Art

An image forming apparatus is equipped with a main control board for controlling the operation of the entire image forming apparatus, a drive control board for controlling drive of rotary members such as photosensitive drums by a motor, and an electric component board such as a high-voltage board for controlling various voltages for realizing charging, developing, and transferring by a power supply, for example. The photosensitive drums that are highly frequently detached for periodic replacement, cleaning, or removal of jammed sheets are arranged in a casing, also referred to as an apparatus body, capable of being attached to and detached from the apparatus from a front side by an operator. Meanwhile, an electric component board is arranged on a back side of the apparatus body so as not to be erroneously accessed by the user using the image forming apparatus and so as not to interfere when attaching and detaching the photosensitive drums.

Hitherto, there has been proposed an apparatus having a controller box storing a main control board disposed pivotably on a casing such that by pivoting the controller box, the operator can access a drive unit arranged on a depth side of the casing (Japanese Patent Application Laid-Open Publication No. 2005-215199).

A drive control board for controlling drive and a drive unit serving as a control target, such as a motor, are connected by a bundle wire in which a plurality of signal wires are bundled, and in order to reduce the length of the bundle wire, the drive control board is arranged closer to the drive unit than the main control board. According to the apparatus disclosed in Japanese Patent Application Laid-Open Publication No. 2005-215199, the drive control board is arranged between the drive unit and the controller box in a front-back direction of the image forming apparatus.

However, in such a case, the drive unit is hidden by the drive control board, such that workability of the operator on the drive unit is deteriorated. For example, when performing maintenance of the drive unit, the operator can only access the drive unit after pivoting the controller box and removing the drive control board, such that the operation was time-consuming and it was difficult to perform efficient operation on the drive unit.

In consideration of the problems described above, the present technique aims at providing an image forming apparatus capable of enhancing workability of the operator on the drive unit arranged on a depth side of the casing than the electric component board which are arranged in a layered manner.

SUMMARY OF THE INVENTION

According to a first aspect of the present invention, an image forming apparatus that forms an image on a recording material includes a frame body, an image forming unit contained in the frame body and configured to form an image on a recording material, a first electric component unit arranged on a back side of the image forming apparatus, and configured to switch between an opened state and a closed state with respect to the frame body, a first electric component board configured to communicate with an external apparatus, the first electric component board being mounted to the first electric component unit, a second electric component unit arranged on the back side of the image forming apparatus, and configured to change between an opened state and a closed state with respect to the frame body, and a second electric component board configured to communicate with the first electric component board and control the image forming unit, the second electric component board being mounted to the second electric component unit. The first electric component unit is configured to pivot about a first pivot axis positioned on a first side in a width direction of the image forming apparatus, the first pivot axis extending in a direction intersecting with the width direction and a front-back direction of the image forming apparatus. The second electric component unit is configured to pivot about a second pivot axis positioned on a second side different from the first side in the width direction of the image forming apparatus, the second pivot axis extending in the direction intersecting with the width direction and the front-back direction. In a state where the first electric component unit and the second electric component unit are in the closed states, the second electric component unit is positioned between the first electric component unit and the image forming unit in the front-back direction of the image forming apparatus.

Further features of the present invention will become apparent from the following description of exemplary embodiments with reference to the attached drawings.

DESCRIPTION OF THE EMBODIMENTS

First Embodiment

Image Forming Apparatus

Figure 1:
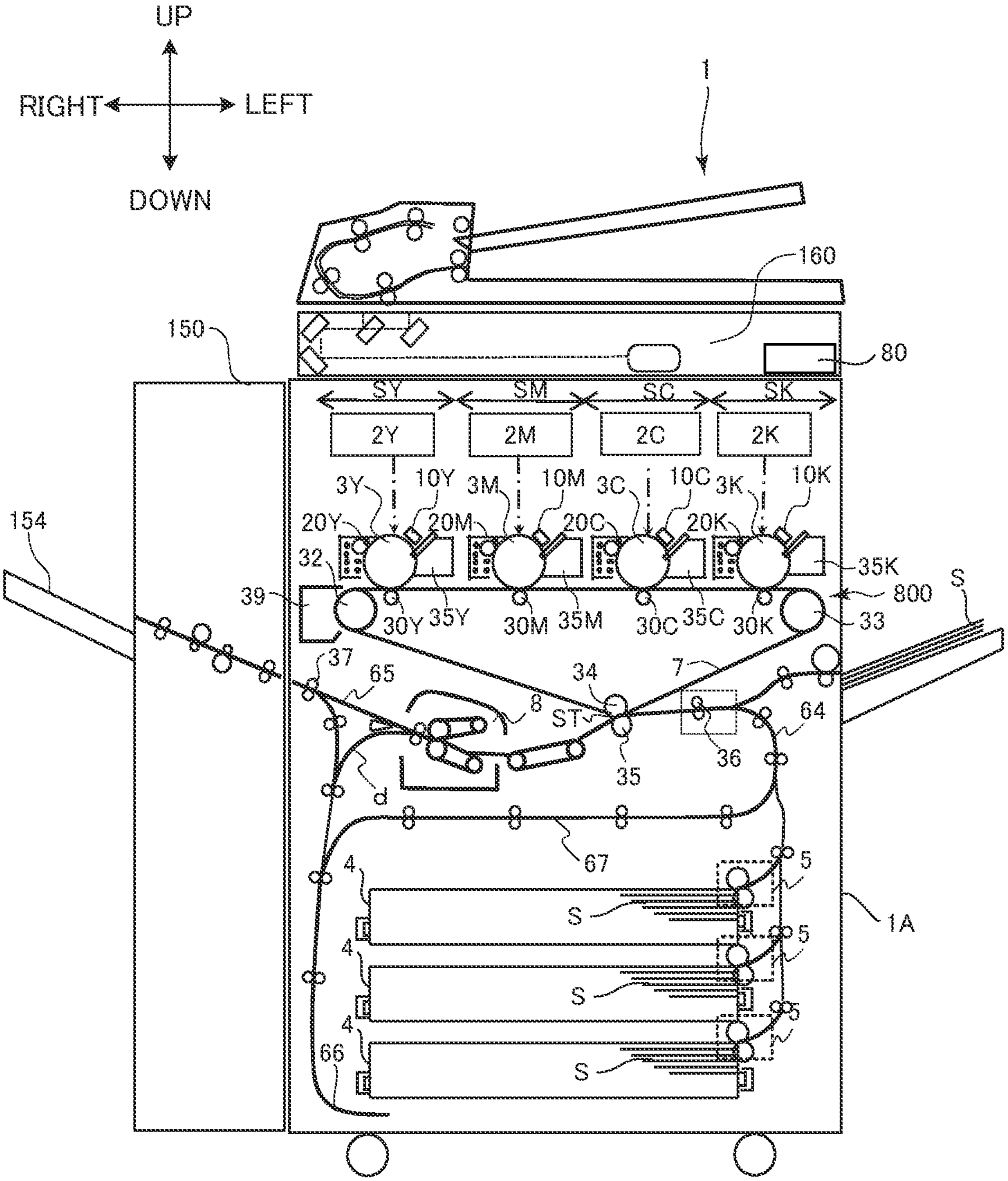
FIG. 1 is a schematic drawing illustrating an image forming apparatus according to a present embodiment.

Now, a first embodiment will be described. At first, a general configuration of an image forming apparatus according to the present embodiment will be described with reference to FIG. 1. As illustrated in FIG. 1, an image forming apparatus 1 is a full-color printer adopting an electrophotographic system with a casing 1A, also referred to as an apparatus body. The casing 1A includes a document reading apparatus 160 for reading an image information from a document, and an operation portion 80. The operation portion 80 includes a display unit capable of displaying various information, keys capable of entering various information in response to the operation by a user, and so on. In the present specification, a side on which the user stands when operating the operation portion 80 is referred to as a "front side", and an opposite side thereof is referred to as a "back side". A left side when viewed from the back side is referred to as "left" and a right side when viewed from the back side is referred to as "right". FIG. 1 illustrates the image forming apparatus 1 viewed from a front side.

The casing 1A serving as a frame body is made of metal and is composed of a front side panel arranged on a front side, a back side panel arranged on a back side and supporting an image forming unit described below and so on together with the front side panel, a stay connecting the front side panel and the back side panel, and a plurality of frames such as columns that support the front side panel, with an exterior cover made of resin attached thereto.

The image forming apparatus 1 according to the present embodiment is a full-color printer adopting an intermediate transfer system, wherein image forming units SY, SM, SC, and SK forming toner images of yellow, magenta, cyan, and black stored in the casing 1A are arranged to face an intermediate transfer belt 7. The image forming apparatus 1 forms a toner image on a recording material S according to image data acquired from the document reading apparatus 160 arranged on an upper portion of the casing 1A or an external apparatus such as a personal computer not shown. Sheet materials such as paper, plastic film, and cloth are examples of the recording material S. The image forming units SY to SK are arranged on the casing 1A in a manner allowing the user to attach and detach the same from a front side.

A conveyance process of the recording material S in the image forming apparatus 1 will be described. The recording materials S are stored in a stacked state within one or a plurality of, three according to the present example, sheet cassettes 4, and the recording materials S are fed one by one at a matched timing with the forming of image by a feed roller 5. The recording material S fed by the feed roller 5 is conveyed to a registration roller 36 arranged in midway of a sheet conveyance path 64. Then, skew correction and timing correction of the recording material S is performed at the registration roller 36, and the recording material S is sent to a secondary transfer portion ST. The secondary transfer portion ST is formed of a secondary transfer inner roller 34 and a secondary transfer outer roller 35 which oppose one another with the intermediate transfer belt 7 interposed therebetween, and they form a nip portion at which the toner image is transferred from the intermediate transfer belt 7 to the recording material S by applying a predetermined pressurizing force and secondary transfer bias.

An image forming process for forming an image that has been sent to the secondary transfer portion ST at a similar timing as the recording material S conveyed to the secondary transfer portion ST via the conveyance process described above will be described. At first, the image forming units SY to SK will be described. Since the configurations of image forming units SY to SK corresponding to respective colors are basically the same except for the different toner colors, the black image forming unit SK is described as an example in the following description.

The image forming unit SK mainly includes a photosensitive drum 3K serving as a photoreceptor, a charging unit 10K, a developing apparatus 20K, a drum cleaner 35K, and so on. A surface of the photosensitive drum 3K rotated by a drum drive unit (refer to FIG. 2 described below) is charged uniformly in advance by the charging unit 10K, and thereafter, an electrostatic latent image is formed by an exposing unit 2K driven based on the image data. Next, the electrostatic latent image formed on the photosensitive drum 3K is visualized via toner development by the developing apparatus 20K. The developing apparatus 20K develops the electrostatic latent image by toner contained in the developer, and forms a toner image on the photosensitive drum 3K.

Thereafter, a predetermined pressurizing force and primary transfer voltage are applied by a primary transfer roller 30K arranged to oppose the image forming unit SK with the intermediate transfer belt 7 interposed therebetween, and the toner image formed on the photosensitive drum 3K is primarily transferred to the intermediate transfer belt 7. The primary transfer residual toner remaining on the photosensitive drum 3K after primary transfer is collected by the drum cleaner 35K (reference characters 35Y, 35M, and 35C denote drum cleaners of the image forming units SY, SM, and SC, respectively).

The intermediate transfer belt 7 is an endless belt that is stretched across a tension roller 32, a driving roller 33, and the secondary transfer inner roller 34, and is moved at a speed corresponding to the rotational speed of the photosensitive drums 3Y, 3M, 3C, and to 3K by the driving roller 33 driven to rotate by a motor or the like. Image forming processes of various colors that are subjected to parallel processing by the image forming units SY to SK of respective colors described above are performed at a timing at which the images are sequentially superposed on a toner image of a different color that has been primarily transferred upstream in a direction of movement of the intermediate transfer belt 7. As a result, a full-color toner image is finally formed on the intermediate transfer belt 7 and conveyed to the secondary transfer portion ST. A secondary transfer residual toner remaining on the intermediate transfer belt 7 after passing through the secondary transfer portion ST is collected from the intermediate transfer belt 7 by a belt cleaner unit 39. The primary transfer rollers 30Y to 30K, the intermediate transfer belt 7, the tension roller 32, the driving roller 33, the secondary transfer inner roller 34, the belt cleaner unit 39, and so on can be disposed integrally as an intermediate transfer belt unit 800.

By the conveyance process and the image forming process described above, the timings of the recording material S and the full-color toner image reaching the secondary transfer portion ST correspond, and a secondary transfer is performed in which the toner image is transferred from the intermediate transfer belt 7 to the recording material S. Thereafter, the recording material S is conveyed to a fixing unit 8, and heat and pressure is applied at the fixing unit 8, by which the toner image is fixed to the recording material S.

In the case of a one-side printing mode in which the toner image is formed to only one side of the recording material S, the recording material S having the toner image fixed thereto by the fixing unit 8 is guided to a sheet discharge conveyance path 65, and discharged to the exterior of the casing 1A by a sheet discharge roller 37. Meanwhile, in a duplex printing mode in which the toner image is formed to both sides of the recording material S, the recording material S to which the toner image has been fixed by the fixing unit 8 is reversed of its front and back sides by a reverse conveyance path 66, before being passed through a duplex conveyance path 67 toward a registration roller 36. Hereafter, the recording material S goes through a similar process as the one-side printing mode to have a toner image formed to the other surface by the fixing unit 8, and thereafter, guided to the sheet discharge conveyance path 65 and finally discharged to the exterior of the casing 1A by the sheet discharge roller 37. According to the present embodiment, a finisher unit 150 carrying out a postprocessing such as a stapling process to the recording material S discharged from the casing 1A is connected to the casing 1A, such that the recording material S being subjected to postprocessing by the finisher unit 150 is placed on a sheet discharge tray 154.

Control System

Figure 2:
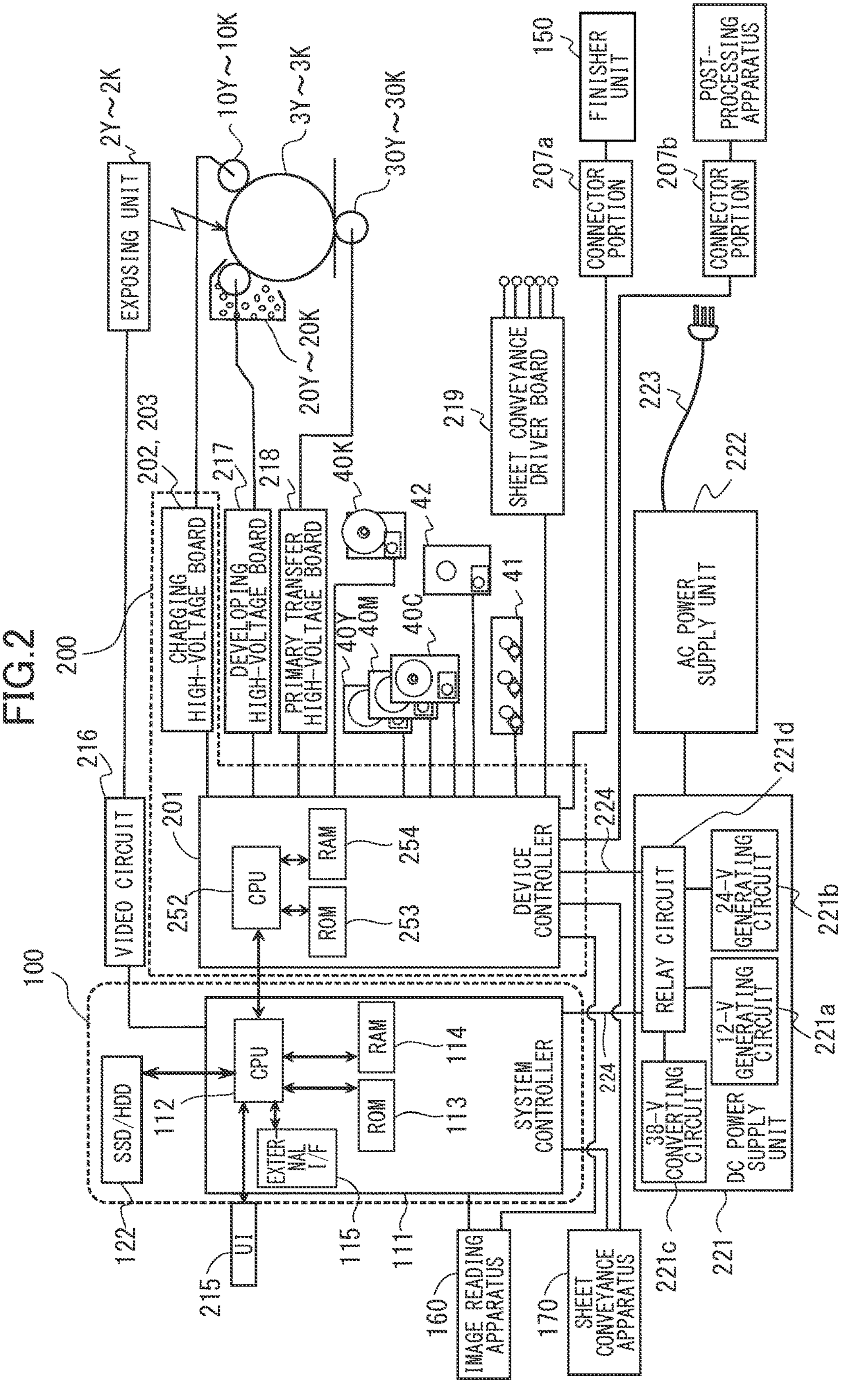
FIG. 2 is a block diagram illustrating a control system of an image forming apparatus.

Next, a control system of the image forming apparatus 1 according to the present embodiment will be described based on FIG. 2 with reference to FIG. 1. The image forming apparatus 1 includes a large number of electric component boards. The electric component board is a board on which a CPU, a memory, an electronic component, an electrical component, a connector, and so on are mounted, for example. The electric component board can include, for example, a system controller 111, a device controller 201, charging high-voltage boards (202 and 203), a developing high-voltage board 217, a primary transfer high-voltage board 218, and a sheet conveyance driver board 219, which are connected to allow electric signals to be communicated therebetween.

In the present embodiment, the system controller 111 and the device controller 201 operate in cooperation at a matched timing to enable control to carry out the image forming operation to the recording material S. The system controller 111 serving as a first electric component board is a main control board that operates by receiving supply of voltage from a DC power supply unit 221, and integrally controls the entire image forming apparatus including the device controller 201. The system controller 111 includes, for example, a Central Processing Unit (CPU) 112, a Read Only Memory (ROM) 113 that stores various programs, a Random Access Memory (RAM) 114 that stores data temporarily, and an external interface (external I/F) 115 for input and output of signals. A user interface (UI) 215 may be provided for interfacing with CPU 112. The CPU 112 is a microprocessor that administers the entire control of the image forming apparatus 1, and it is the core of the system controller 111. A storage unit 122 such as an SSD/HDD capable of storing electronic data is connected to the system controller 111, and image processing program and image data are stored in the storage unit 122.

Along with the execution of an image forming program, the system controller 111 converts an image data acquired, for example, from the document reading apparatus 160 (refer to FIG. 1) or an external apparatus connected via the external interface 115 to exposure data by a video circuit 216. Thereafter, the system controller 111 controls the exposing units 2Y to 2K to expose the photosensitive drums 3Y to 3K based on the exposure data. Further, the system controller 111 exposes the photosensitive drums 3Y to 3K based on the exposure data acquired by converting the image data read out from the storage unit 122.

The system controller 111 is respectively connected to the feed roller 5, the registration roller 36, and the sheet discharge roller 37, which are collectively referred to as a sheet conveyance apparatus 170, for conveying the recording material S, and the document reading apparatus 160 (refer to FIG. 1). Voltage is supplied to the document reading apparatus 160 and the sheet conveyance apparatus 170 from the DC power supply unit 221 via the device controller 201 connected by a signal wire for power supply (referred to as a power supply wire).

The device controller 201 serving as a second electric component board includes a CPU 252, a ROM 253, and a RAM 254, and controls the finisher unit 150 connected via a connector portion 207*a* and other postprocessing apparatuses that are connected via a connector portion 207*b*. The device controller 201 is connected to the DC power supply unit 221. The device controller 201 outputs a command to the DC power supply unit 221 to allow DC voltage to be supplied from the DC power supply unit 221 to various units at a most suitable timing in response to control. That is, the DC power supply unit 221 is connected to an AC power supply unit 222 through a power supply wire. The AC power supply unit 222 connects an AC commercial power supply, entered from a power supply outlet via a power supply wire 223 and a filter (not shown), to the DC power supply unit 221.

The DC power supply unit 221 includes a 12V generating circuit 221*a*, a 24V generating circuit 221*b*, and a 38V converting circuit 221*c*. The DC power supply unit 221 converts an AC voltage supplied from the AC power supply unit 222 into DC voltage, and generates DC voltage of "12V, 24V, and 38V" by the 12V generating circuit 221*a*, the 24V generating circuit 221*b*, and the 38V converting circuit 221*c* for operating various devices. Further, the DC power supply unit 221 includes a relay board 221*d* (relay circuit), and the relay board 221*d* is connected to respective electric component boards by power supply wires 224 to distribute voltage to the respective electric component boards described below. The relay board 221*d* also has a function to control a cooling fan (not shown) for taking outside air into the apparatus body or the fixing unit 8, for example, such that it is also connected to the device controller 201 by a signal wire for control.

Further, the device controller 201 is connected to the charging high-voltage boards (202 and 203), the developing high-voltage board 217, the primary transfer high-voltage board 218, the sheet conveyance driver board 219, and so on. That is, the second electric component boards include the charging high-voltage boards (202 and 203), and the device controller 201 serving as a device controller board configured to control the charging high-voltage boards (202 and 203). The device controller 201 is connected, for example, to drum drive units 40Y, 40M, 40C, and 40K, developing drive units (41 and 42), and so on. The device controller 201 receives commands from the system controller 111 and performs control. The drum drive units 40Y to 40K serving as driving units are motors or the like for rotating the photosensitive drums, for example. That is, the drum drive units 40Y to 40K include a drive motor configured to rotate the photosensitive drums. The developing drive units (41 and 42) are motors or the like for rotating developing sleeves of developing apparatuses 20Y, 20M, 20C, and 20K, for example. The charging high-voltage boards (202 and 203), the developing high-voltage board 217, and the primary transfer high-voltage board 218 generate high voltage required in charging, developing and transferring processes. The charging high-voltage board 202 supplies voltage to the charging units 10Y, 10M, and 10C, and the charging high-voltage board 203 supplies voltage to the charging unit 10K. The primary transfer high-voltage board 218 is configured to generate a high voltage used in the primary transfer rollers 30Y, 30M, 30C, and 30K serving as transfer apparatuses. The device controller 201 serving as a second electric component board is connected to the primary transfer high-voltage board 218. The sheet conveyance driver board 219 controls the feed roller 5, the registration roller 36, and the sheet discharge roller 37 that convey the recording material S (refer to FIG. 1).

The present embodiment illustrates an example in which the sheet conveyance driver board 219 is connected to the DC power supply unit 221 through the device controller 201, but the present technique is not limited thereto. For example, a driver board not shown can be provided for each of the feed roller 5, the registration roller 36, and the sheet discharge roller 37, and each of the driver boards can be connected to the DC power supply unit 221.

Further, the device controller 201 and the system controller 111 can be connected through an Application Specific Integrated Circuit (ASIC). Furthermore, the device controller 201 and the relay board 221*d* can be connected through the ASIC.

Figure 3A:
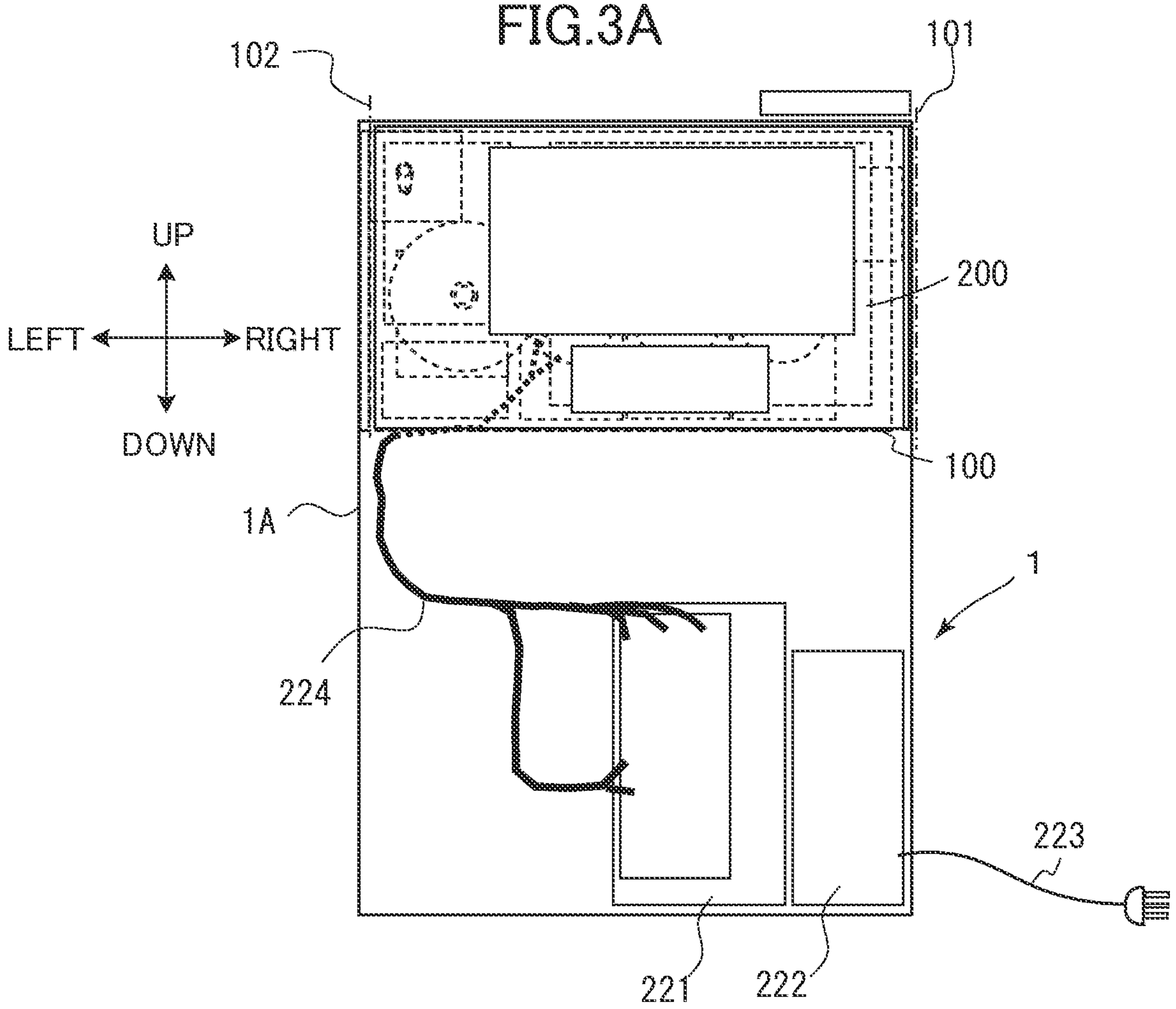
FIG. 3A is a back view illustrating the image forming apparatus.

Next, a back side configuration of the image forming apparatus 1 according to the present embodiment will be described based on FIGS. 3A to 5 with reference to FIGS. 1 and 2. FIG. 3A is a back view illustrating the image forming apparatus 1 in a state where the apparatus body, or the casing 1A, is viewed from the back side, and FIG. 3B is a top view illustrating the back side of the image forming apparatus 1.

As illustrated in FIG. 3A, a controller box unit 100 and a device controller unit 200 are arranged pivotably on the casing 1A at an upper back side of the image forming apparatus 1, as described in detail below. The controller box unit 100 serving as a first electric component unit is provided pivotably about a first pivot shaft 101, and the device controller unit 200 serving as a second electric component unit is provided pivotably about a second pivot shaft 102. Meanwhile, the DC power supply unit 221 and the AC power supply unit 222 described above are arranged within the casing 1A at a lower back side of the image forming apparatus 1. The image forming apparatus 1 can operate when the controller box unit 100 and the device controller unit 200 are closed.

Figure 3B:
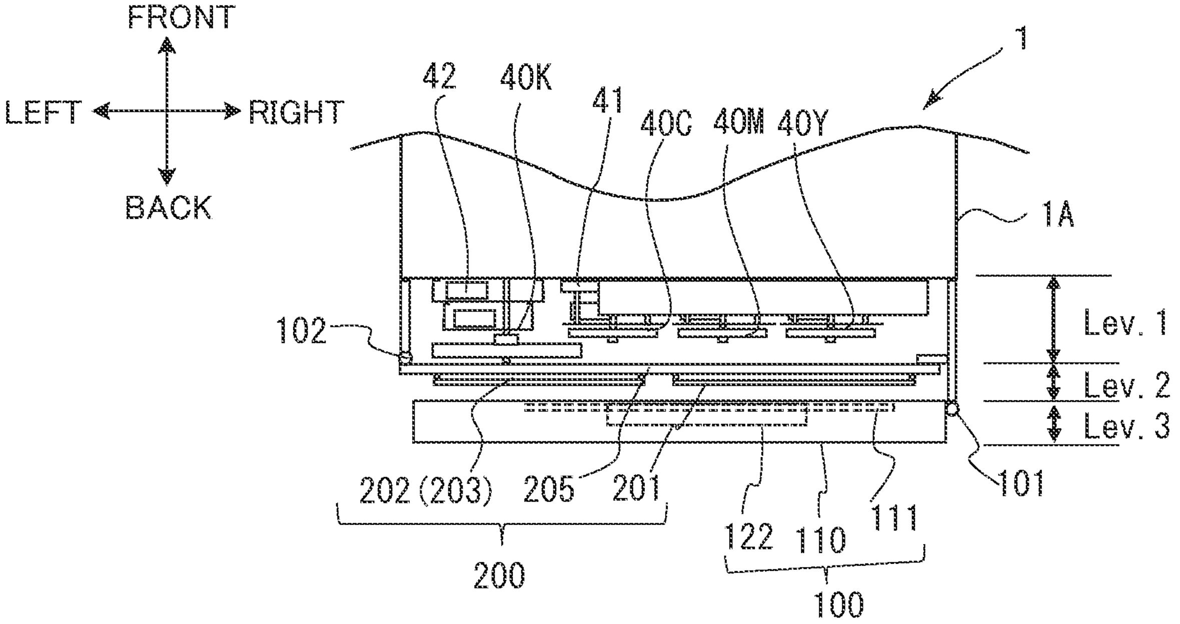
FIG. 3B is a top view illustrating a back side of the image forming apparatus.

The upper back side of the image forming apparatus 1 can be broadly divided into three layers, which are Lev. 1, Lev. 2, and Lev. 3, in the named order from the layer closest to the front side in the front-back direction, as illustrated in FIG. 3B. In the present embodiment, the drum drive units 40Y to 40K, the developing drive units (41 and 42), and electric contacts (not shown) for supplying high voltage required for the charging, developing, and transferring processes are arranged on the first layer (Lev. 1). The drum drive units 40Y to 40K and the developing drive units (41 and 42) are provided with physical interfaces for the photosensitive drums 3Y to 3K and the developing apparatuses 20Y to 20K, and they are arranged adjacent to the photosensitive drums 3Y to 3K and the developing apparatuses 20Y to 20K arranged in the casing 1A in the front-back direction.

The device controller 201 for performing control of and supplying voltage to respective drive units arranged on the first layer, and charging high-voltage boards (202 and 203) for controlling supply of voltage to the contact on the first layer are arranged on the second layer (Lev. 2). These electric component boards are supported on a board support plate 205 at adjacent positions so as to be connected via a shortest distance to corresponding drive units arranged on the first layer. According to the present embodiment, the board support plate 205 supports the electric component boards only on a first surface, and does not support electric components boards on a second surface opposite to the first surface. Moreover, the board support plate 205 is a conductor.

The board support plate 205 is supported at a left end and a right end to the casing 1A across the entire area of the casing 1A in a right-left direction, or width direction. The device controller 201 and the charging high-voltage boards (202 and 203) are aligned planarly on a first surface of the board support plate 205 serving as a back side of the apparatus. The device controller unit 200 is composed of the board support plate 205, the device controller 201, and the charging high-voltage boards (202 and 203). As described, the device controller unit 200 includes the charging high-voltage boards (202 and 203) arranged on a surface facing the controller box unit 100 in a state where the controller box unit 100 and the device controller unit 200 are closed.

The system controller 111, the storage unit 122, and a controller box 110 made of metal that stores and supports the system controller 111 are arranged on a third layer (Lev. 3). Noise is easily generated in the system controller 111 due to its characteristic feature of simultaneously processing image data and commands from the operation portion 80 at high speed. Thus, the system controller 111 is stored in the controller box 110 made of metal so as to prevent the generated noise from affecting other electric component boards. The controller box unit 100 is composed of the system controller 111, the storage unit 122, and the controller box 110. The controller box unit 100 has the system controller 111 arranged on a surface facing the device controller unit 200 in a state where the controller box unit 100 and the device controller unit 200 are closed.

As described, the image forming apparatus 1 realizes saving of space both in the right-left direction and the front-back direction to prevent increase in size, and a highly dense arrangement on the back side is realized. However, due to the high-density arrangement, the user cannot easily access the drum drive units 40Y to 40K and the developing drive units (41 and 42) arranged on the first layer. Therefore, the device controller unit 200 and the controller box unit 100 are respectively pivotably arranged so as to allow the operator to access the units on the first layer by a small number of steps. The device controller unit 200 and the controller box unit 100 can be pivoted without disconnecting signal wires respectively connected thereto. The controller box unit 100 and the device controller unit 200 are each prevented from opening unintentionally by being fixed via screws or the like to the casing 1A in the closed state.

Figure 4:
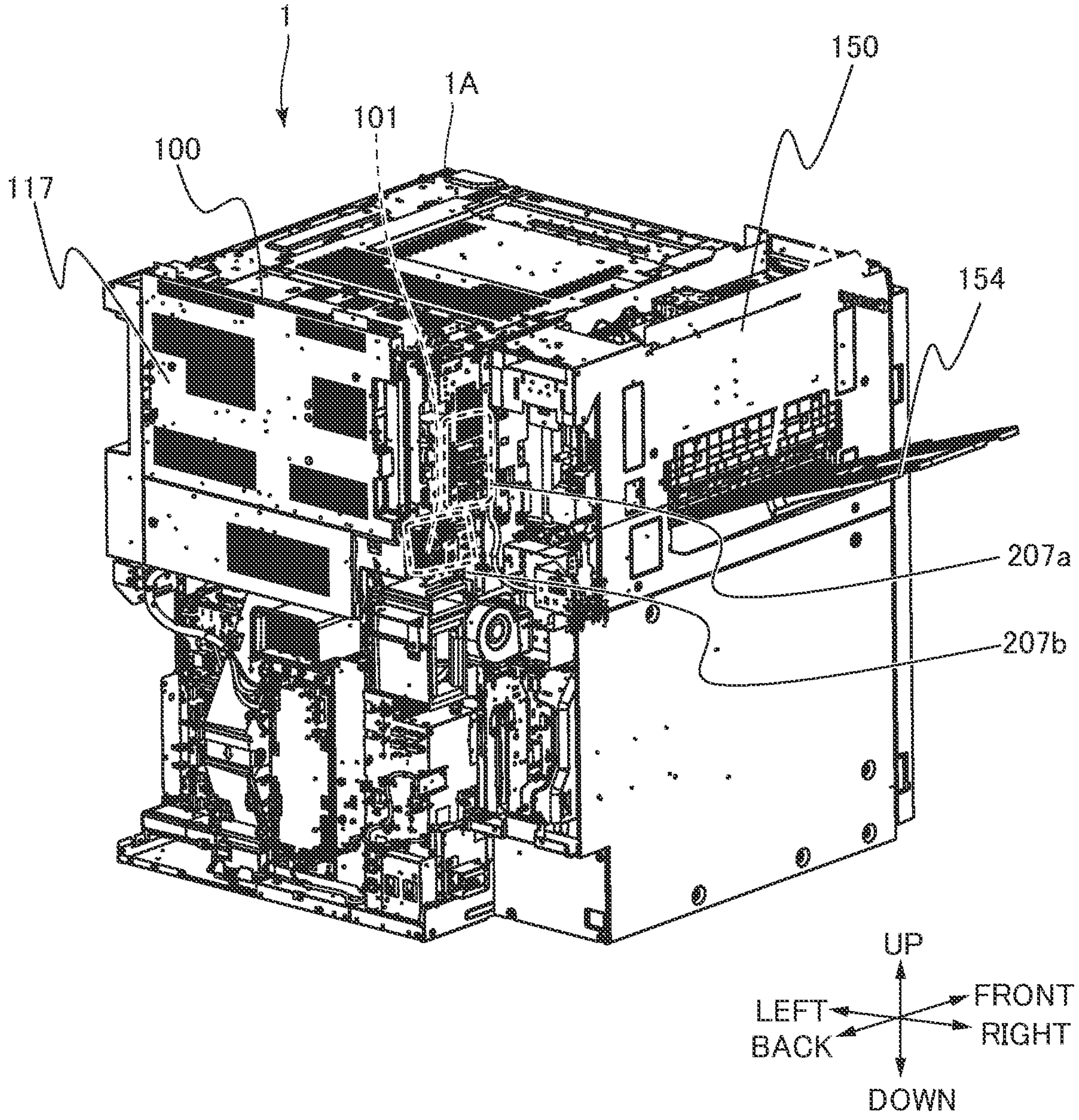
FIG. 4 is a perspective view illustrating the image forming apparatus with a controller box unit closed.
Figure 5:
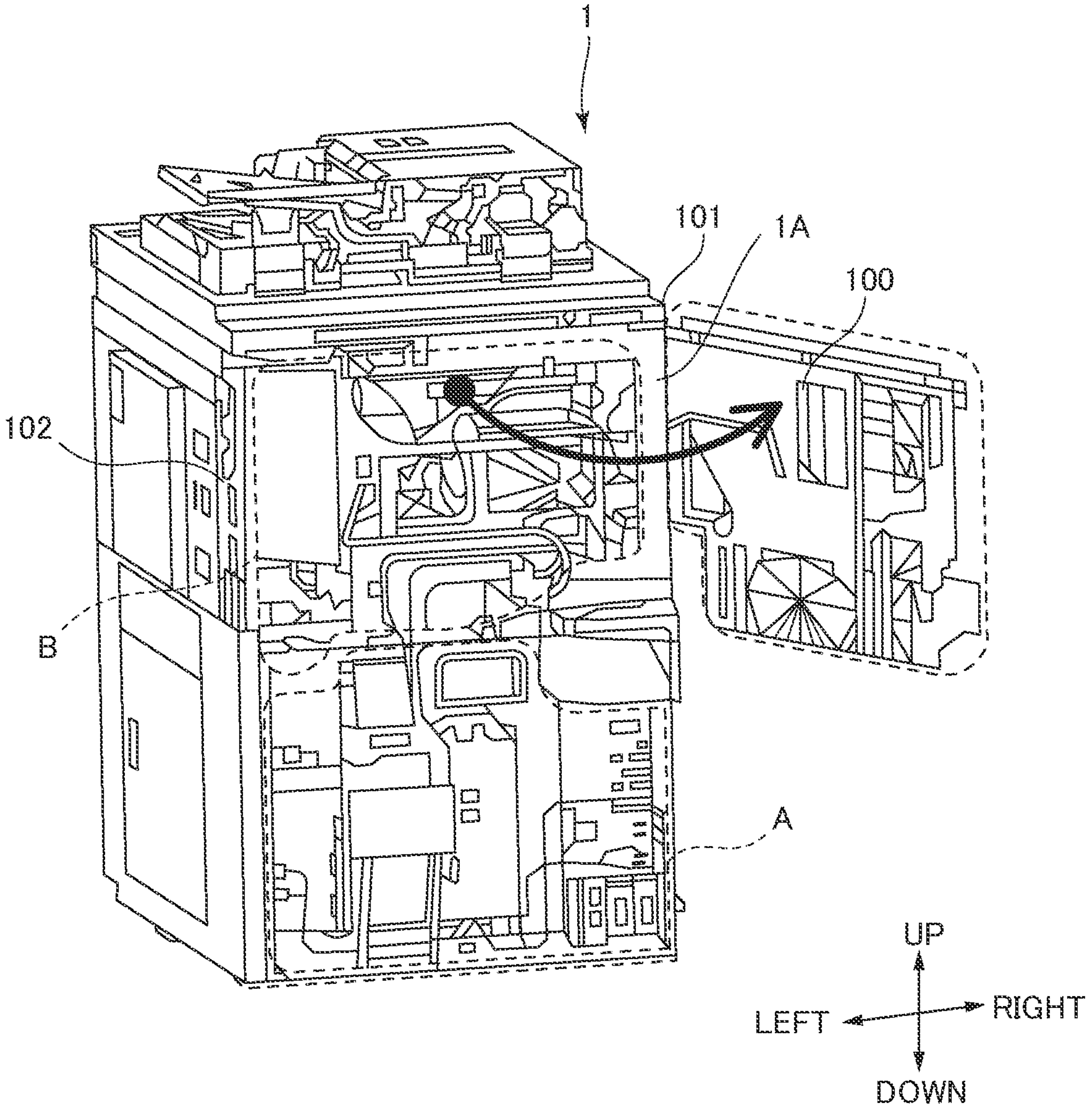
FIG. 5 is a perspective view illustrating the image forming apparatus with the controller box unit opened.

FIG. 4 is a perspective view illustrating the image forming apparatus 1 with the controller box unit 100 closed, and FIG. 5 is a perspective view illustrating the image forming apparatus 1 with the controller box unit 100 opened.

As illustrated in FIGS. 4 and 5, the controller box unit 100 is arranged openably and closably with respect to the casing 1A by pivoting about the first pivot shaft 101. In the present embodiment, the first pivot shaft 101 is arranged at a position closer to a right end portion than a center of the casing 1A in the right-left direction when the image forming apparatus 1 is viewed from a back, or back, side.

The image forming apparatus 1 is designed such that user-operated systems being operated by the user, such as the operation portion 80, are arranged collectively on the front side, so that the operator does not have to move to the back side of the image forming apparatus 1 and perform operation from the back side when removing jammed sheets during a recovery operation, for example. Since the user-operated systems are collectively arranged on the front side, drive systems for applying driving force for respective units of the apparatus and electric component systems for performing electric control are collectively arranged on the back side. The electric component systems described here include electric component boards such as a power-supply system board, a high-voltage system board, a control system board, and a drive system board, or a wire system such as a bundle wire having bundled a plurality of signal wires connecting the respective boards.

A relatively heavy load such as a transformer is attached to the power-supply system board, and since they are a source of noise generation, the power-supply system board must be covered with metal plates and shielded. Therefore, a power-supply system unit in which a large number of power-supply system boards are collectively arranged is heavy. Further, a power supply cord for feeding power from a power supply outlet is connected to the power-supply system unit. The power supply cord is securely covered with a safety coating, by which the weight becomes relatively heavy, and it is not preferable for the point of connection with the power-supply system unit to be arranged at an upper area of the apparatus body since the weight of the cord acts in a disconnecting direction to the connected portion of the power supply cord. Therefore, the power-supply system unit is preferably arranged at a lower area of the casing 1A (area A of FIG. 5).

Meanwhile, the electric-component system unit such as the high-voltage system board, the control system board, and the drive system board should preferably have a short bundle wire length in which multiple signal wires arranged at a location close to the load of each board are bundled, and it is preferably arranged in an area in the vicinity of the image forming units SY to SK (area B of FIG. 5).

Electric component boards of the electric-component system unit that are especially vulnerable to noise are collectively stored in the controller box 110. The controller box 110 is formed in a box shape of metal plates to cover and shield the system controller 111 that is vulnerable to noise, and it is electrically conducted with the casing 1A to set the ground level equal to the casing 1A to ensure a noise resistance.

Controller Box Unit

Figure 6C:
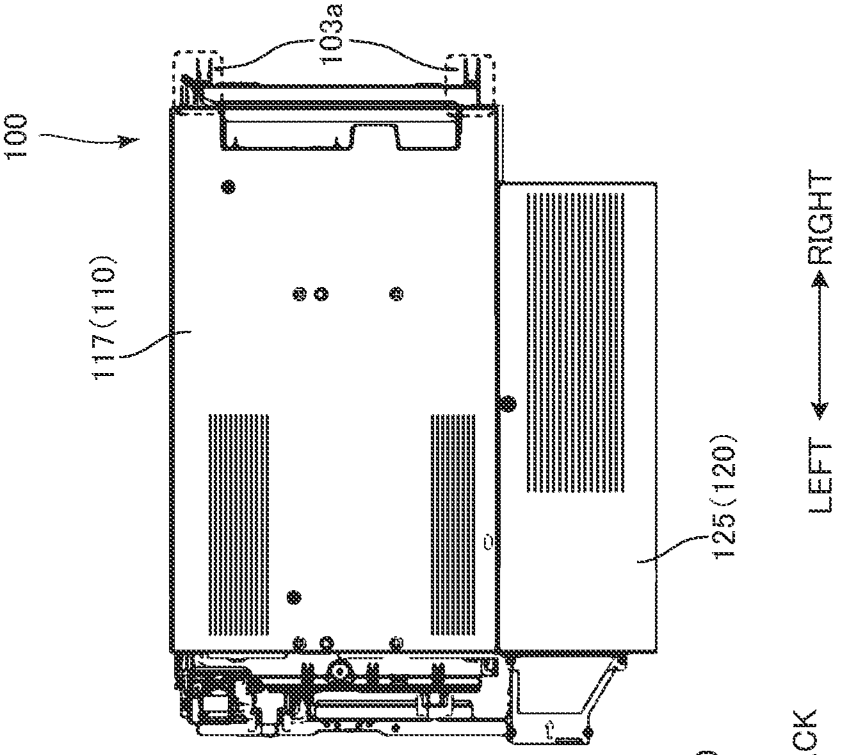
FIG. 6C is a schematic drawing illustrating a back side of the controller box unit.
Figure 6B:
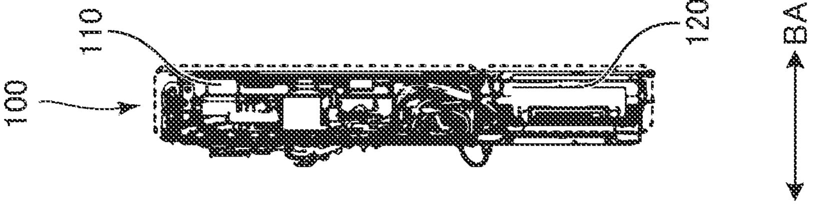
FIG. 6B is a cross-sectional view of the controller box unit taken at line A-A'.
Figure 6A:
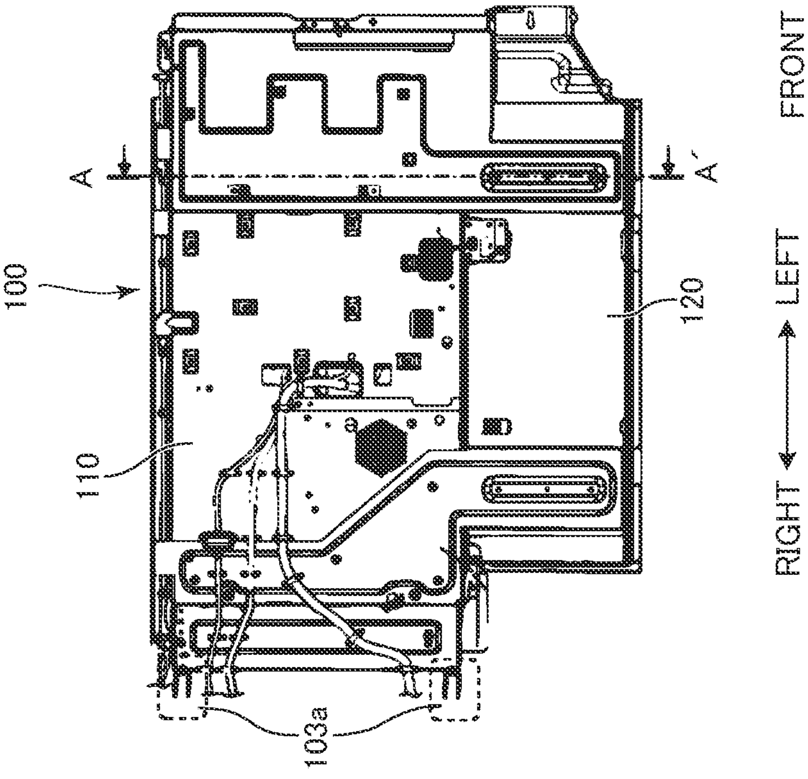
FIG. 6A is a schematic drawing illustrating a front side of the controller box unit.

Next, a configuration of the controller box unit 100 will be described based on FIGS. 6A to 6C with reference to FIGS. 1 and 2. The controller box unit 100 includes the controller box 110 storing the system controller 111 and a storage unit storage portion 120 storing the storage unit 122.

The controller box unit 100 is pivotable with respect to the casing 1A about the first pivot shaft 101 of a hinge mechanism 103*a* with the signal wire still connected. This is to correspond to the need of a maintenance of the image forming apparatus 1 by the operator with the controller box unit 100 pivoted, and it is used, for example, when performing initial diagnosis of a fault location. By pivoting the controller box unit 100, the operator can access various units arranged on the depth side of the controller box 110 in the casing 1A without removing the controller box 110 from the casing 1A.

The controller box 110 and the storage unit storage portion 120 form independent closed spaces that are surrounded by metal plates, and in which the system controller 111 and the storage unit 122 are respectively stored. Exterior covers 117 and 125 that can each be detached independently are provided on the back side of the controller box 110 and the storage unit storage portion 120, as illustrated in FIG. 6C. The exterior covers 117 and 125 pivot together with the controller box unit 100. The exterior cover 125 of the storage unit storage portion 120 can be detached even with the controller box unit 100 closed, such that the operator can access the storage unit 122 in a state where the controller box unit 100 is closed.

The controller box unit 100 is fixed by screws and the like to the casing 1A in the closed state, and it is also possible to provide noise countermeasures by realizing electric conduction with the casing 1A through a screw fixing portion, a hinge pivot portion, and gasket portions provided on upper and lower sides (not shown).

Device Controller Unit

Figure 7A:
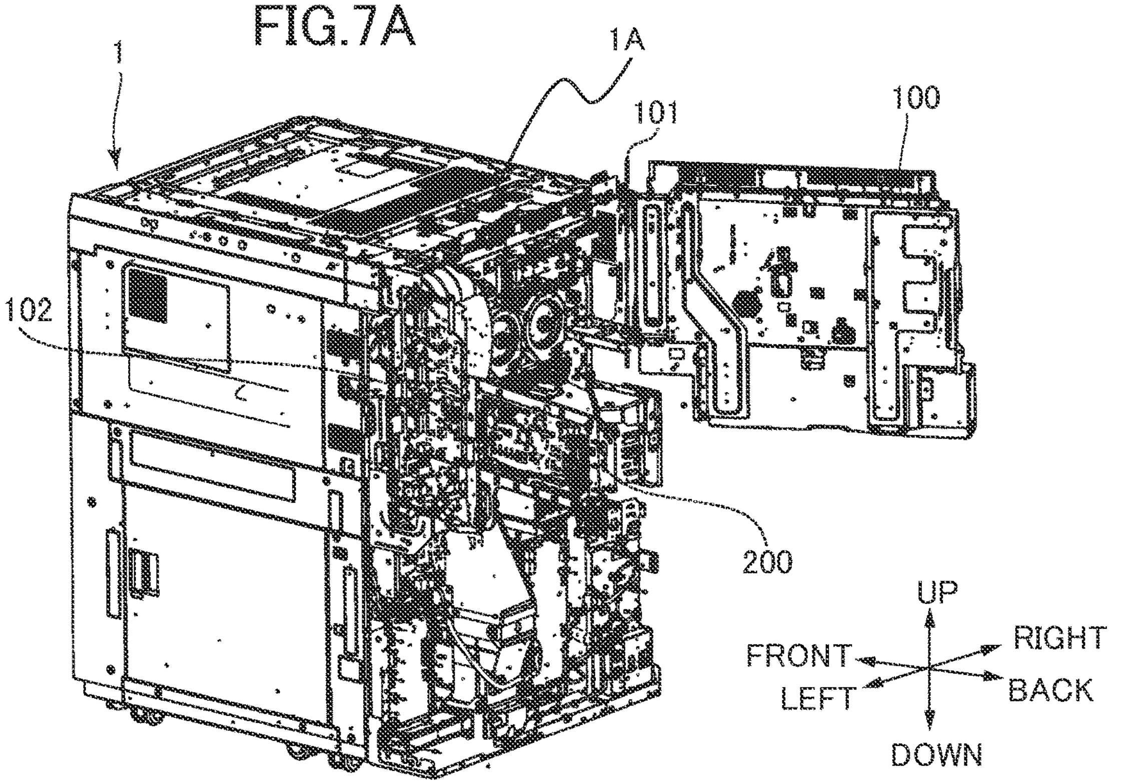
FIG. 7A is a perspective view illustrating the image forming apparatus with the controller box unit and a device controller unit opened.
Figure 7B:
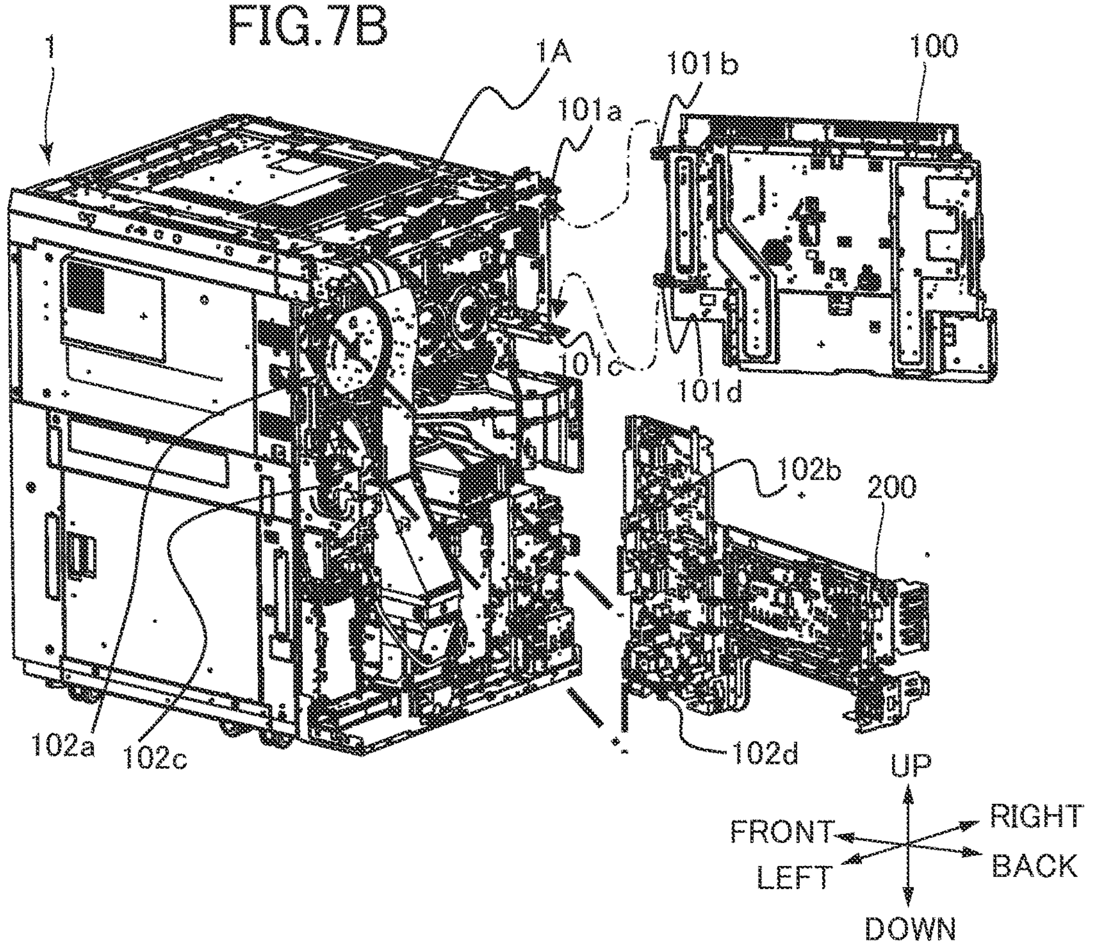
FIG. 7B is an exploded perspective view illustrating an image forming apparatus with the controller box unit and the device controller unit removed.

Next, the device controller unit 200 will be described based on FIGS. 7A to 10 with reference to FIG. 2. FIG. 7A is a perspective view illustrating the image forming apparatus 1 with the controller box unit 100 and the device controller unit 200 opened. FIG. 7B is an exploded perspective view illustrating the image forming apparatus 1 with the controller box unit 100 and the device controller unit 200 detached.

Here, a direction orthogonal to the first pivot shaft 101 of the controller box unit 100 in the closed state and a thickness direction of the device controller 201 is referred to as an orthogonal direction, that is, right-left direction. That is, the orthogonal direction is a direction intersecting with an up-down direction and a front-back direction of the image forming apparatus. The second pivot shaft 102 is arranged approximately in parallel with the first pivot shaft 101 of the controller box unit 100 and on the opposite side from the first pivot shaft 101 with respect to the orthogonal. The device controller unit 200 is provided in an openable and closable manner with respect to the casing 1A by pivoting about the second pivot shaft 102. Further according to the present embodiment, regarding the right-left direction, the direction from the second pivot shaft 102 toward the first pivot shaft 101 is referred to as a right direction, or first direction, and a direction opposite to the right direction is referred to as a left direction, or second direction. In the present embodiment, in a state where the controller box unit 100 and the device controller unit 200 are closed, the device controller unit 200 is positioned in a superposed manner with the controller box unit 100 on the inner side of the controller box unit 100. In that case, the device controller unit 200 is positioned between the drum drive units 40Y to 40K and the controller box unit 100 in a thickness direction, or front-back direction, of the device controller 201. In a state where the controller box unit 100 is opened, the device controller unit 200 is arranged pivotably about the second pivot shaft 102. As described, the controller box unit 100 and the device controller unit 200 are configured to open with respect to the casing 1A at a back, side.

A shaft portion 101*a* provided on the casing 1A fits to a fitting hole 101*b* on the controller box unit 100 and a shaft portion 101*c* provided on the casing 1A fits to a fitting hole 101*d* on the controller box unit 100 along a dash-dot line illustrated in FIG. 7B. That is, the hinge mechanism 103*a* (refer to FIG. 6A) is composed of two shaft portions 101*a* and 101*c* and two fitting holes 101*b* and 101*d*. The shaft portions 101*a* and 101*c* are each relatively movable with respect to the fitting holes 101*b* and 101*d*, and thereby, the controller box unit 100 is supported pivotably on the casing 1A.

Similarly, a shaft portion 102*a* provided on the casing 1A fits to a fitting hole 102*b* on the device controller unit 200 and a shaft portion 102*c* provided on the casing 1A fits to a fitting hole 102*d* on the device controller unit 200 along a dash-dot line illustrated in FIG. 7B. The shaft portions 102*a* and 102*c* are each relatively movable with respect to the fitting holes 102*b* and 102*d*, and thereby, the device controller unit 200 is supported pivotably on the casing 1A. That is, the shaft portions 102*a* and 102*c* and the fitting holes 102*b* and 102*d* form a hinge mechanism.

As illustrated in FIG. 7A, the controller box unit 100 is opened by being pivoted to the right side. In a state where the controller box unit 100 is opened, the device controller unit 200 arranged on a depth side, or front side, of the controller box unit 100 is exposed. Thereby, the device controller unit 200 can be pivoted, and it is opened by being pivoted to the left side. As described, the controller box unit 100 and the device controller unit 200 are opened to the right and left. If maintenance property is emphasized, it is preferable to design the electric component system arranged in layers to be opened layer by layer. Therefore, the controller box unit 100 layered on the outer side of the device controller unit 200 is designed to pivot with respect to the casing 1A, by which the operator can easily perform maintenance of the device controller unit 200. Further, the device controller unit 200 is designed to pivot with respect to the casing 1A, by which the operator can easily perform maintenance of drive units being the target driven by the device controller unit 200 that are arranged on the depth side of the device controller unit 200.

Figure 8:
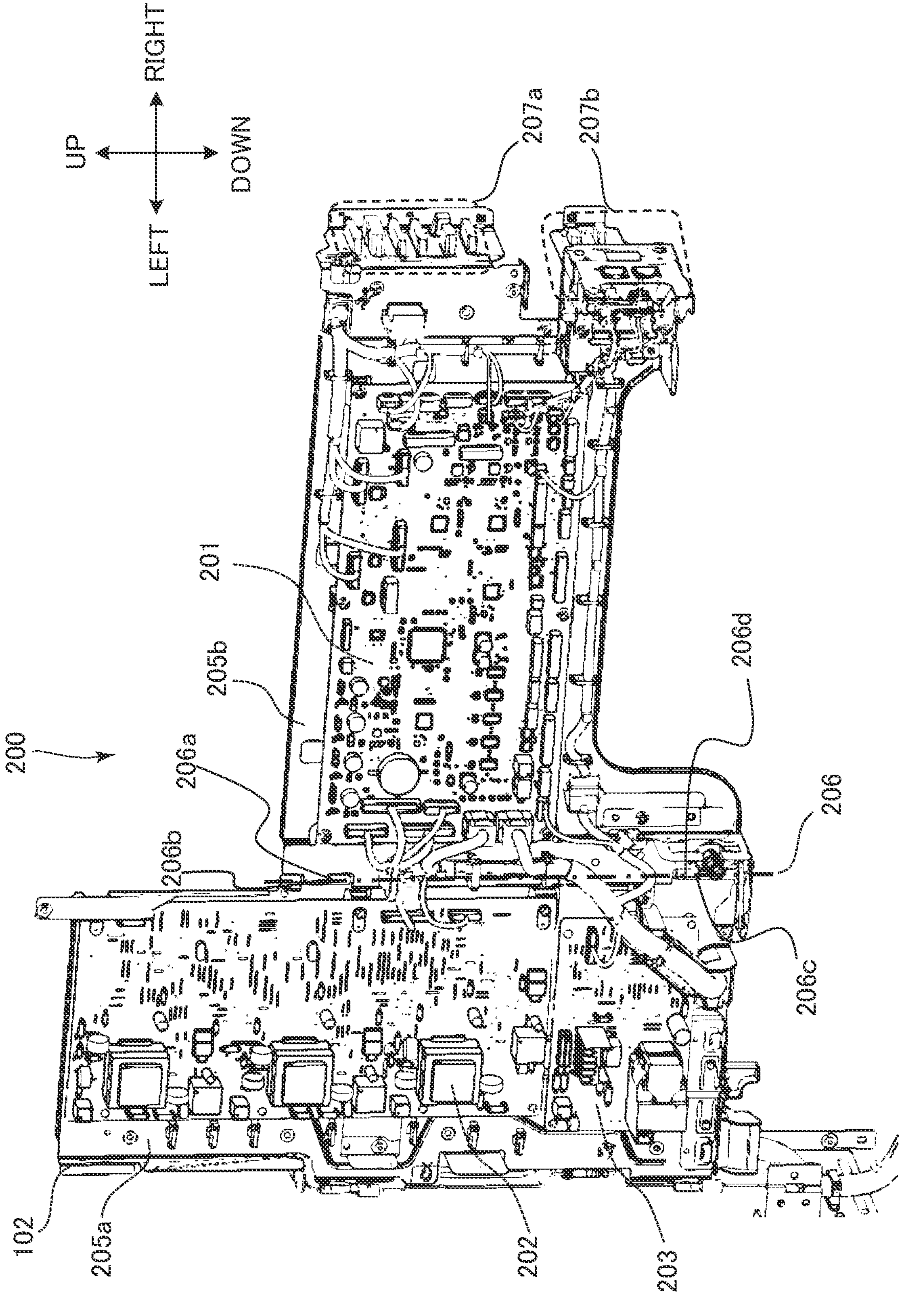
FIG. 8 is a perspective view illustrating the device controller unit.
Figure 9:
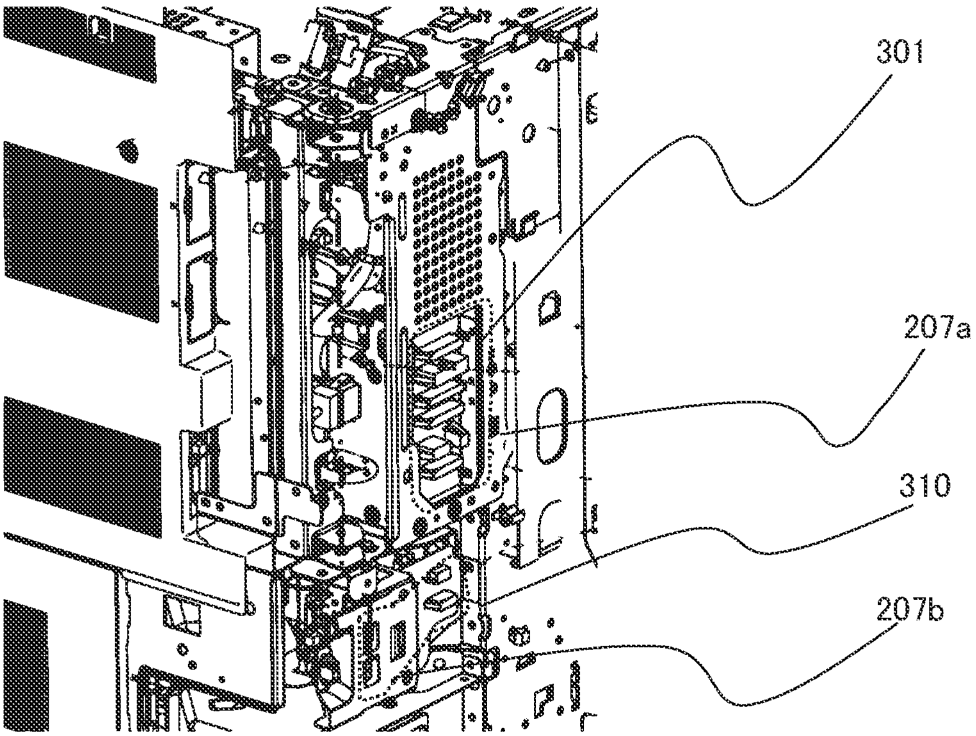
FIG. 9 is a perspective view illustrating a vicinity of a connector portion of the device controller unit.
Figure 10:
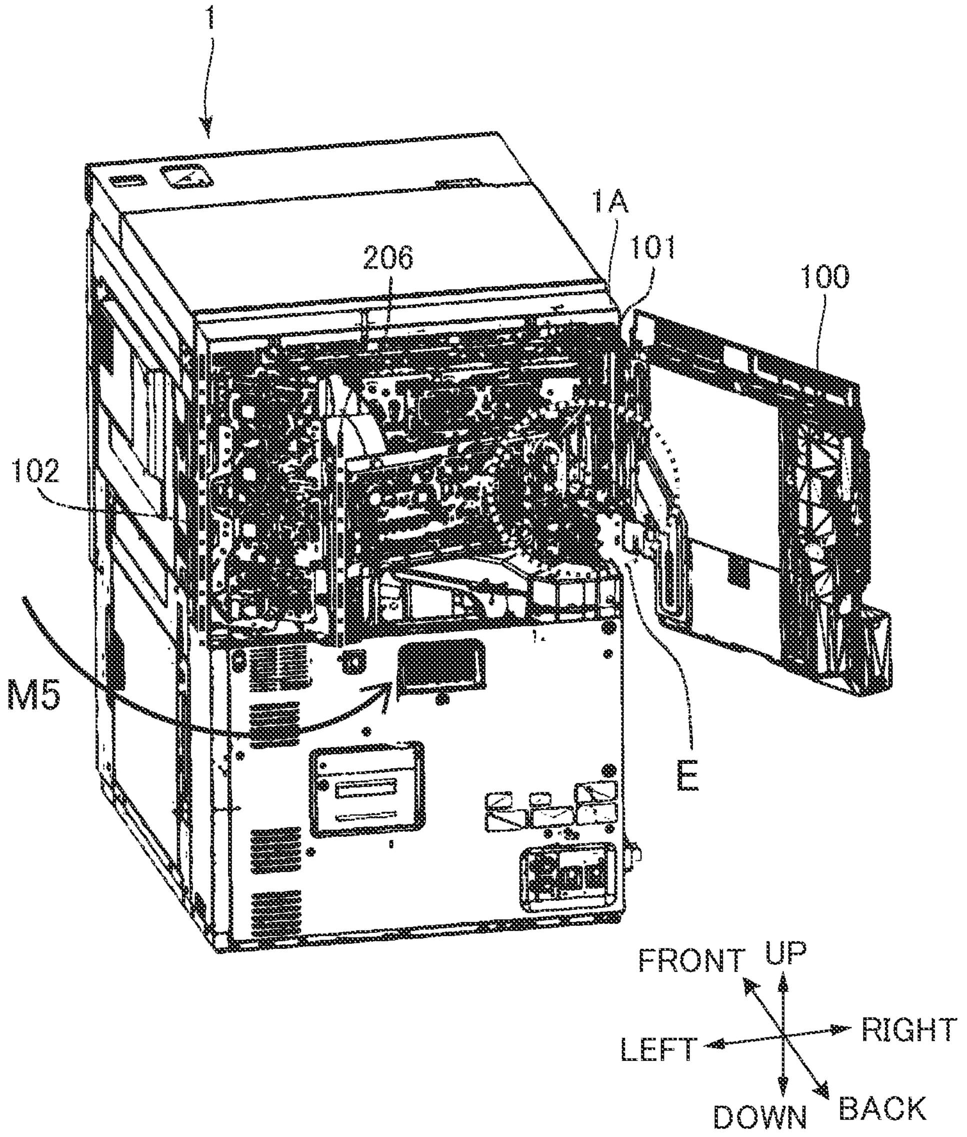
FIG. 10 is a perspective view illustrating a pivoting state of the device controller unit.

FIG. 8 illustrates the device controller unit 200 according to the first embodiment, and FIG. 9 illustrates a vicinity of the connector portions 207*a* and 207*b* of the device controller unit 200. FIG. 10 illustrates a state in which the device controller unit 200 is pivoted in the direction of arrow M5.

As illustrated in FIG. 8, according to the device controller unit 200 of the present embodiment, the board support plate 205 is broadly divided into a first support plate 205*a* and a second support plate 205*b*. The charging high-voltage boards (202 and 203) are arranged on the first support plate 205*a*, and the device controller 201 is arranged on the second support plate 205*b*. A third pivot shaft 206 is provided to allow the second support plate 205*b* to pivot with respect to the first support plate 205*a*. The device controller unit 200 includes the first support plate 205*a* that pivots about the second pivot shaft 102, the third pivot shaft 206 arranged approximately in parallel with the second pivot shaft 102 of the first support plate 205*a* on an opposite side from the second pivot shaft 102 in the right-left direction, and the second support plate 205*b* that pivots with respect to the first support plate 205*a* about the third pivot shaft 206.

The second support plate 205*b* includes shaft portions 206*a* and 206*c*, and the first support plate 205*a* includes fitting holes 206*b* and 206*d*. The shaft portions 206*a* and 206*c* of the second support plate 205*b* fit to the fitting holes 206*b* and 206*d* of the first support plate 205*a*. Thereby, the second support plate 205*b* is enabled to pivot with respect to the first support plate 205*a*. The fitting holes 102*b* and 102*d* (refer to FIG. 7B) described above is also provided on the first support plate 205*a*.

There are cases where postprocessing apparatuses for expanding functions are connected to the image forming apparatus 1. Such postprocessing apparatuses and the device controller 201 are electrically connected, and the postprocessing apparatus executes postprocessing while communicating with the device controller 201. In the present embodiment, the finisher unit 150 and the device controller 201 are electrically connected, such that the recording material S subjected to postprocessing by the finisher unit 150 is discharged. As described, there may be a case where a different casing is connected to the casing 1A of the image forming apparatus 1, and in that case, there is a signal wire that is connected to the device controller 201 across casings. In that case, it is possible to arrange a connector portion for relaying connection to the device controller 201 at a boundary between the casing and another casing and allowing the signal wire to be connected thereto, the workability during installation operation can be preferably improved.

According to the present embodiment, the finisher unit 150 is arranged downstream in a sheet discharge direction of the recording material S in the casing 1A (refer to FIG. 1). Therefore, the connector portions 207*a* and 207*b* serving as connectors for connecting the casing 1A and the casing of the finisher unit 150 by signal wires are arranged to be exposed from the casing 1A at the right side opposite to the second pivot shaft 102, as illustrated in FIGS. 8 and 9, to enable external signal wires to be connected thereto. According to the present embodiment, the connector portions 207*a* and 207*b* are arranged one above the other in a vertical direction at a right end portion of the second support plate 205*b*. For example, a signal wire for connecting the finisher unit 150 is connected to the connector portion 207*a* arranged on the upper side in the vertical direction, and a signal wire for connecting a postprocessing apparatus other than the finisher unit 150 is connected to the connector portion 207*b* arranged on the lower side in the vertical direction.

Since the connector portions (207*a* and 207*b*) are used for connecting post processing apparatuses arranged downstream of the casing 1A, they are arranged on the downstream side in the device controller unit 200. The connector portions (207*a* and 207*b*) should preferably be disposed on the side wall on the downstream side of the device controller unit 200 so as to be exposed from the casing 1A. In the present embodiment, as illustrated in FIG. 9, the first connector portion 207*a* is arranged to be exposed through an opening 301 formed on a right side of the casing 1A, and the second connector portion 207*b* is arranged to be exposed through a cutout portion 310 formed on a right side of the casing 1A.

Further, since the connector portions (207*a* and 207*b*) are relay portions for connecting the postprocessing apparatuses and the device controller 201 as described above, it is preferable for the connector portions (207*a* and 207*b*) to be provided on the device controller unit 200. Thereby, when pivoting the device controller unit 200, the operator can pivot the connector portions (207*a* and 207*b*) integrally with the device controller 201 without disengaging the connection thereof with the device controller 201, such that the workability of the operator during maintenance is improved.

In the present embodiment, as described above, the controller box unit 100 is arranged on the outer side of the device controller unit 200, and as illustrated in FIG. 10, the first pivot shaft 101 is arranged on the right side of the casing 1A. The connector portions (207*a* and 207*b*) described above are arranged to be exposed from a right side at a front-side position of the first pivot shaft 101 in the front-back direction of the controller box unit 100. That is, since the device controller unit 200 is layered with the controller box unit 100 in the front-back direction, a portion of the connector portions (207*a* and 207*b*) is superposed with a projection plane of the first pivot shaft 101 of the controller box unit 100. In this case, a right end portion of the device controller unit 200 on the opposite side as the second pivot shaft 102 is positioned further toward the right than the first pivot shaft 101 of the controller box unit 100 in the right-left direction in a state where the device controller unit 200 is closed (refer to FIG. 11A described below).

Figures 11A, 11B, 11C:
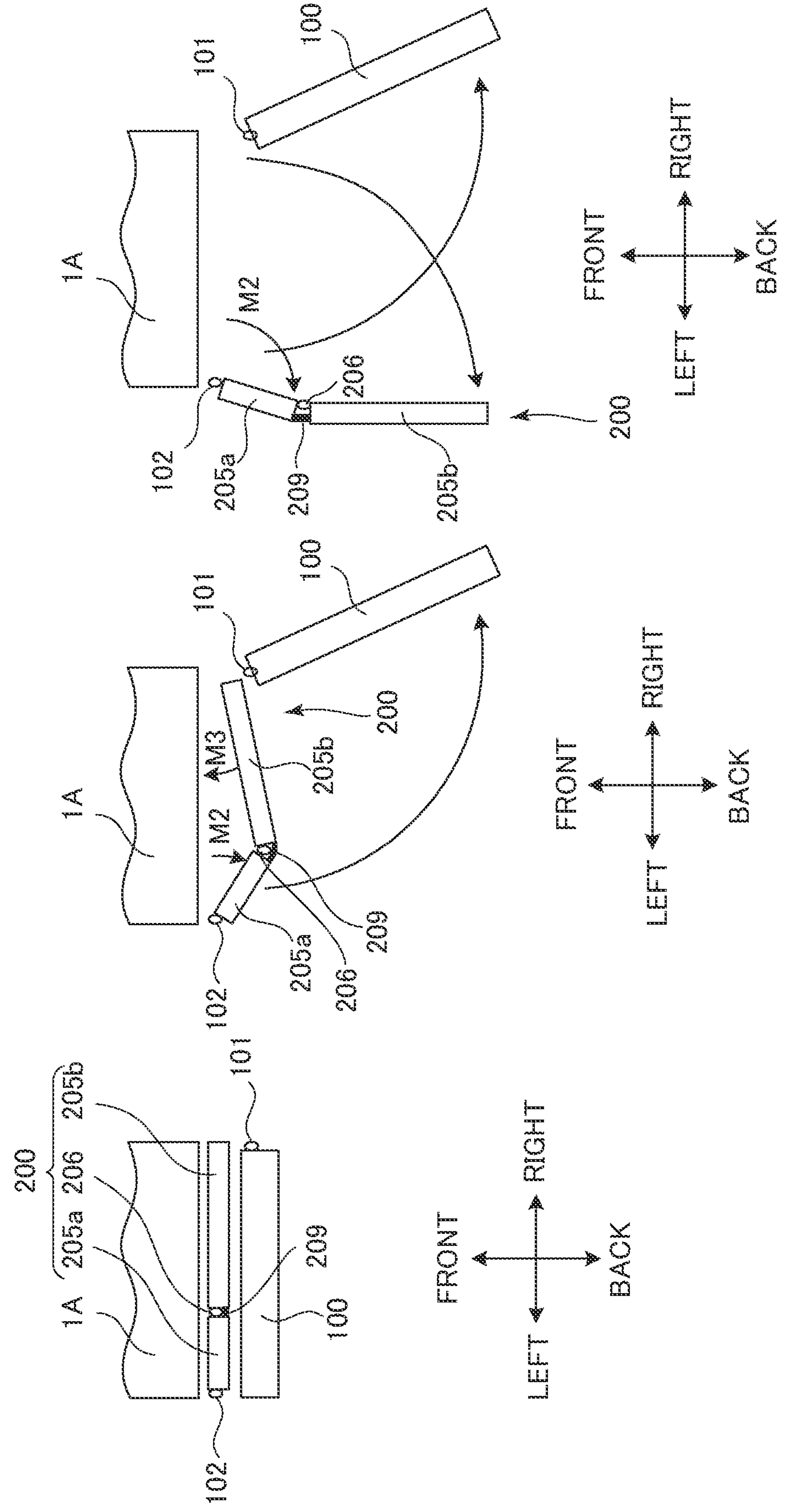
FIG. 11A is a top view illustrating the pivoting of the device controller unit in a closed state.
FIG. 11B is a top view illustrating the pivoting of the device controller unit in a pivoting state.
FIG. 11C is a top view illustrating the pivoting of the device controller unit in an opened state.

As described above, in a state where the end opposite to the second pivot shaft 102 of the device controller unit 200 is positioned further toward the right than the first pivot shaft 101, even if the operator attempts to simply pivot the device controller unit 200 about the second pivot shaft 102, the pivoting is obstructed by the first pivot shaft 101. Therefore, according to the present embodiment, the third pivot shaft 206 is provided to enable the second support plate 205*b* to pivot with respect to the first support plate 205*a* in the device controller unit 200. Such pivoting movement of the device controller unit 200 will be described with reference to FIGS. 11A to 11C. FIG. 11A illustrates a closed state prior to pivoting of the device controller unit 200, FIG. 11B illustrates a state during pivoting of the device controller unit 200, and FIG. 11C illustrates an opened state after pivoting of the device controller unit 200.

As illustrated in FIG. 11A, the first pivot shaft 101 of the controller box unit 100 is arranged on a right side, and the second pivot shaft 102 of the device controller unit 200 is arranged on a left side. That is, the controller box unit 100 pivots toward the right side with its left end serving as a pivoting end, and the device controller unit 200 pivots toward the left side with its right end serving as the pivoting end.

As illustrated in FIG. 11B, when opening the device controller unit 200, the first support plate 205*a* pivots toward the direction of arrow M2 with respect to the casing 1A about the second pivot shaft 102. Together therewith, the second support plate 205*b* pivots toward the direction of arrow M3 with respect to the first support plate 205*a* about the third pivot shaft 206. As described, when opening the device controller unit 200, the second support plate 205*b* pivots in such a manner as to be folded inward with respect to the first support plate 205*a*. That is, the device controller unit 200 adopts a two-axis pivot structure including the first support plate 205*a* and the second support plate 205*b*. The first support plate 205*a* serving as a first plate portion retains a first board. The second support plate 205*b* serving as a second plate portion is disposed pivotably with respect to the first support plate 205*a* and retains a second board that differs from the first board. Thereby, the right end portion of the second support plate 205*b* is moved to a position not overlapped with the projection of the first pivot shaft 101. Thus, the right end portion of the second support plate 205*b* is moved to a position not overlapped with the projection of the first pivot shaft 101, such that as illustrated in FIG. 11C, the device controller unit 200 can be pivoted greatly about the second pivot shaft 102 and opened without having its pivoting movement obstructed by the first pivot shaft 101.

As described, according to the present embodiment, the first support plate 205*a* and the second support plate 205*b* are designed to pivot about the third pivot shaft 206. Thereby, as described above, the connector portions (207*a* and 207*b*) are disposed on the pivoting end of the device controller unit 200, such that the device controller unit 200 is enabled to pivot even if the pivoting end of the device controller unit 200 in the closed state is positioned further toward the right than the first pivot shaft 101. Thereby, the connector portions (207*a* and 207*b*) can be disposed on the pivoting end of the device controller unit 200 that can be easily exposed from the casing 1A and to which the signal wires from the external finisher unit 150 can be easily connected.

Further, the first support plate 205*a* and the second support plate 205*b* are designed such that the second support plate 205*b* does not fold backward, that is, opposite to the direction of arrow M3, with respect to the first support plate 205*a* by a hinge mechanism 209 including the third pivot shaft 206. The hinge mechanism 209 regulates the pivoting direction of the second support plate 205*b* with respect to the first support plate 205*a* as a regulating portion.

Fastening Configuration of Device Controller Unit

According to the present embodiment, the device controller unit 200 is fixed to the casing 1A so as not to be pivoted, by having the pivoting end side, which is the right side in the present example, fastened to the casing 1A by a screw 220. Since the device controller unit 200 pivots about the second pivot shaft 102 disposed on the first side, which is the left side in the present example, it is easily displaced by being affected by the fitting backlash of the second pivot shaft 102 or the third pivot shaft 206. If displaced, the second side, i.e., pivoting end side, opposite to the second pivot shaft 102 may be sagged toward the gravity direction than the first side. This is not preferable since when closing the device controller unit 200 and screwing the same onto the casing 1A, the operator must adjust the position the device controller unit 200 to a position capable of fastening to the casing 1A using a screw. Therefore, according to the present embodiment, a guide portion is provided to the device controller unit 200 to move the device controller unit 200 to a screw fastening position of the casing 1A when closing the device controller unit 200. The guide portion will be described with reference to FIG. 12.

Figure 12:
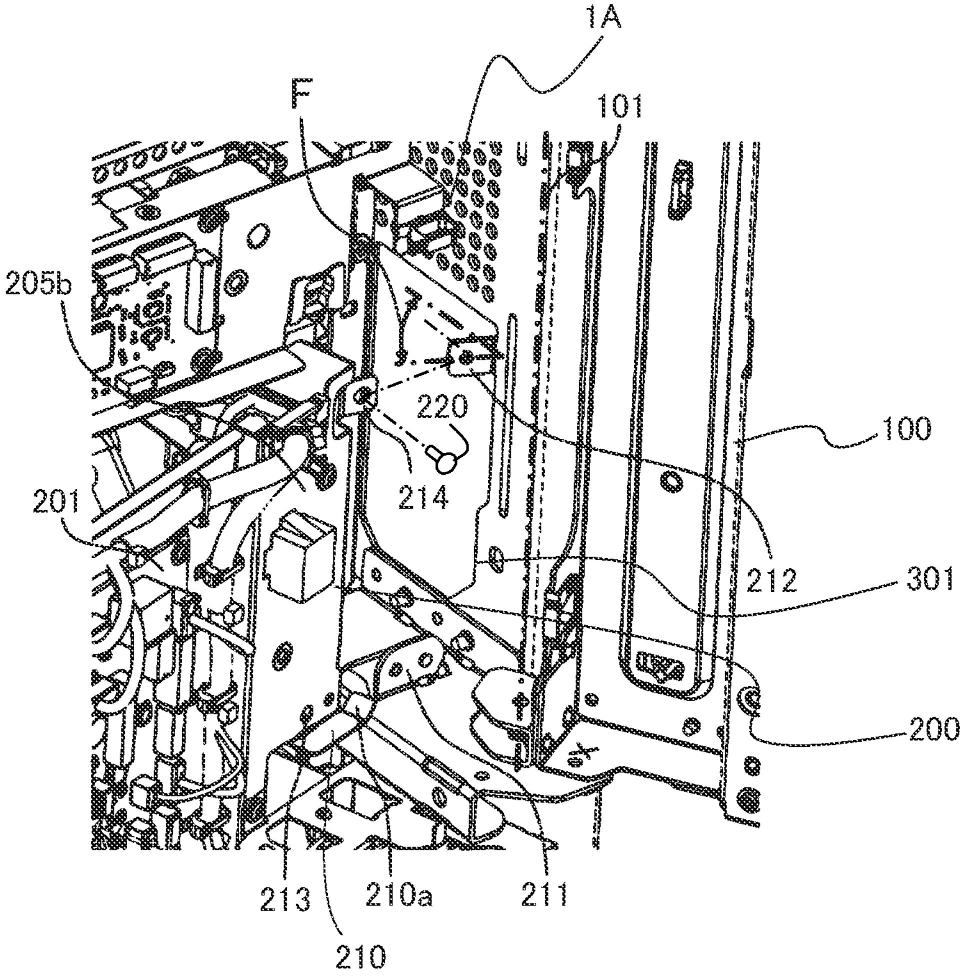
FIG. 12 is a perspective view illustrating a guide portion and a fastening portion.

FIG. 12 is a perspective view illustrating portion E of FIG. 10 in enlarged view. As illustrated in FIG. 12, a fastening portion 212 having a fastening hole for fastening the screw 220, serving as an example of a fastening member, or the like for fixing the device controller unit 200, is provided to protrude toward the left direction from the right side surface of the casing 1A. Further, a supporting portion 211 capable of supporting a pivoting end side, or a guide portion 210 to be more specific as mentioned below, of the device controller unit 200 from below is provided to protrude toward the left direction from the right side surface of the casing 1A. A fastening hole for fastening the screw 220 is also formed to the supporting portion 211. The fastening portion 212 and the supporting portion 211 each having the fastening hole are disposed at separate positions in the up-down direction within the casing 1A.

Meanwhile, an upper side fastened portion 214 capable of meeting with the fastening hole of the fastening portion 212 and being screw-engaged therewith is disposed on an upper side in the up-down direction and a lower side fastened portion 213 capable of meeting with the fastening hole of the supporting portion 211 and being screw-engaged therewith is disposed on a lower side in the up-down direction at the pivoting end side of the device controller unit 200, more specifically, the second support plate 205*b*. Further, the guide portion 210 extending in the right-left direction is disposed on a plane supporting the device controller 201 at the pivoting end side of the device controller unit 200. The guide portion 210 is supported from below by the supporting portion 211 disposed on the casing 1A when the device controller unit 200 is pivoted and closed.

The guide portion 210 has an inclined portion 210*a* that is inclined such that a more downstream portion thereof in a pivoting end side direction, that is the right direction, is higher. When the device controller unit 200 is closed, the guide portion 210 contacts the supporting portion 211. In this state, the inclined portion 210*a* of the guide portion 210 abuts against the supporting portion 211, and the pivoting end side of the device controller unit 200 is moved in a manner lifted upward along the inclination of the inclined portion 210*a*. Then, the guide portion 210 is placed on the supporting portion 211, by which the device controller unit 200 is supported from below by the supporting portion 211. The supporting portion 211 is designed to have the fastening portion 212 and the upper side fastened portion 214 roughly correspond to one another and to have the fastening hole of the supporting portion 211 and the lower side fastened portion 213 roughly correspond to one another in a state supporting the device controller unit 200. Thereby, when being closed, the device controller unit 200 is positioned at the screw fastening position of the casing 1A by the supporting portion 211. Thereby, even if the pivoting end side of the device controller unit 200 is sagged toward the gravity direction than the first side, the operator can smoothly position the device controller unit 200 to the screw fastening position of the casing 1A and to perform screw engagement thereof.

Further, as a configuration for positioning the device controller unit 200 to the screw fastening position of the casing 1A, for example, it is possible to arrange the second pivot shaft 102 to be inclined so as to cancel out the sagging of the device controller unit 200. It is also possible to tilt the second pivot shaft 102 and further provide the guide portion 210 having the inclined portion 210*a* mentioned above.

The device controller unit 200 is required to be electrically connected to the casing 1A from the viewpoint of suppressing the influence of noise on the electric component board. In the present embodiment, the device controller unit 200 is electrically connected to the casing 1A by being screw-engaged to the fastening portion 212 and the supporting portion 211. In other words, the fastening portion 212 and the supporting portion 211 provided on the casing 1A and the upper side fastened portion 214 and the lower side fastened portion 213 provided on the device controller unit 200 have conductivity.

In order to prevent the device controller unit 200 from being left unfastened to the casing 1A, care is needed to improve the visibility of the fastening portion 212 to facilitate fastening. Further according to the present embodiment, as described above, the device controller unit 200 in the closed state has the end portion, i.e., pivoting end, opposite to the second pivot shaft 102 positioned further toward the right than the first pivot shaft 101. Therefore, there is a need to enable the operator to perform the screwing operation without the first pivot shaft 101 interfering therewith when fastening the device controller unit 200 at an end side, i.e., pivoting end side, opposite to the second pivot shaft 102 using a screw 220.

Therefore, according to the present embodiment, the fastening portion 212 is provided on the side surface of the casing 1A with respect to the right-left direction, with a screw fastening surface facing inward, i.e., toward the front side, when viewed in the right-left direction. That is, a first fastening surface to which the upper side fastened portion 214 of the fastening portion 212 is fastened is inclined such that the second direction side thereof is positioned closer to the drum drive units 40Y to 40K in the front-back direction than the first direction side thereof. It is preferable from the viewpoint of improvement of visibility and screw fastening workability to have the screw fastening surface of the fastening portion 212 inclined at an inclination angle F of 25° or more and 65° or less with respect to the right side surface of the casing 1A. In the present embodiment, the inclination angle F is 65°. The screw fastening surface of the upper side fastened portion 214 in the device controller unit 200 is inclined in correspondence with the inclination of the screw fastening surface of the fastening portion 212. That is, a second fastening surface fastened to the fastening portion 212 of the upper side fastened portion 214 is arranged in an inclined manner to meet the first fastening surface. As described, by inclining the screw fastening surface of the fastening portion 212 and the screw fastening surface of the upper side fastened portion 214, it becomes possible to have the upper side fastened portion 214 slide against the fastening portion 212 and easily ground the same when closing the device controller unit 200.

As described, according to the present embodiment, the device controller unit 200 supporting the device controller 201 and the controller box unit 100 including the system controller 111 are disposed pivotably on the back side of the casing 1A with the device controller unit 200 arranged on the depth side. The controller box unit 100 and the device controller unit 200 are opened toward the left and right by being pivoted with respect to the casing 1A. The device controller 201 is arranged between the drive unit such as the drum drive units 40Y to 40K and the developing drive units (41 and 42) being the control target and the controller box unit 100 in the front-back direction. Since the controller box unit 100 is pivotable with respect to the casing 1A, the operator can perform maintenance of the device controller unit 200 easily. Further, since the device controller unit 200 is pivotable with respect to the casing 1A, the operator can perform maintenance of the drive unit that is arranged on the depth side of the device controller unit 200. Thereby, the operator can access the drive unit hidden behind the device controller unit 200 without taking time by easily pivoting the controller box unit 100 and the device controller unit 200. That is, the workability of the operator on the drive unit can be improved in a case where the drive unit is arranged on the depth side of the electric component boards such as the system controller 111 and the device controller 201 that are arranged in layers.

Second Embodiment

In the first embodiment described above, the second support plate 205*b* is pivoted with respect to the first support plate 205*a* about the third pivot shaft 206, such that the pivoting of the device controller unit 200 is not obstructed by the first pivot shaft 101 (refer to FIG. 11B), but the present technique is not limited to this configuration. A second embodiment capable of pivoting a device controller unit 200A such that the pivoting is not obstructed by the first pivot shaft 101 will be described with reference to FIGS. 13A to 13C.

Figures 13A, 13B, 13C:
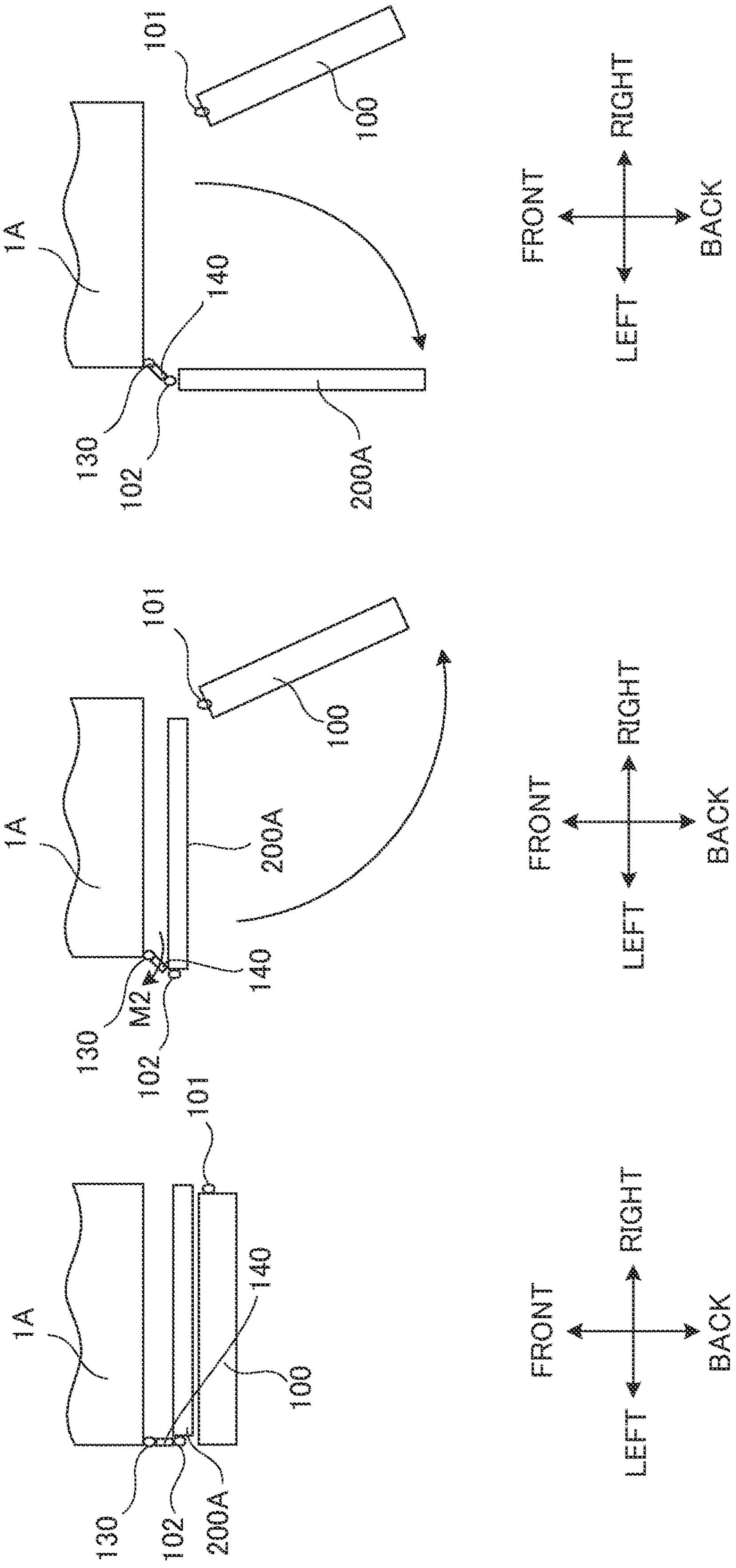
FIG. 13A is a top view illustrating a retaining member before movement according to a second embodiment.
FIG. 13B is a top view illustrating the retaining member during movement according to the second embodiment.
FIG. 13C is a top view illustrating the retaining member after movement according to the second embodiment.

In the second embodiment, as illustrated in FIG. 13A, the device controller unit 200A does not include the third pivot shaft 206, but instead, a retaining member 140 capable of moving the device controller unit 200A which is closed with respect to the casing 1A in the right-left direction while maintaining the closed state is provided. The retaining member 140 has a pivot shaft 130 provided on a first side, wherein the first side is attached pivotably on the casing 1A about the pivot shaft 130, and a second side is attached to the second pivot shaft 102 of the device controller unit 200A to retain the device controller unit 200A pivotably about the second pivot shaft 102.

As illustrated in FIG. 13B, by having the retaining member 140 serving as a moving member pivot about the pivot shaft 130, the device controller unit 200A is moved in the right-left direction in a state closed with respect to the casing 1A. Thereby, the right end portion of the device controller unit 200A is moved to a position not overlapped with the projection of the first pivot shaft 101. Since the right end portion of the second support plate 205*b* is moved to a position not overlapped with the projection of the first pivot shaft 101, as illustrated in FIG. 13C, the device controller unit 200A can pivot greatly about the second pivot shaft 102 without being obstructed by the first pivot shaft 101.

Third Embodiment

Figures 14A, 14B, 14C:
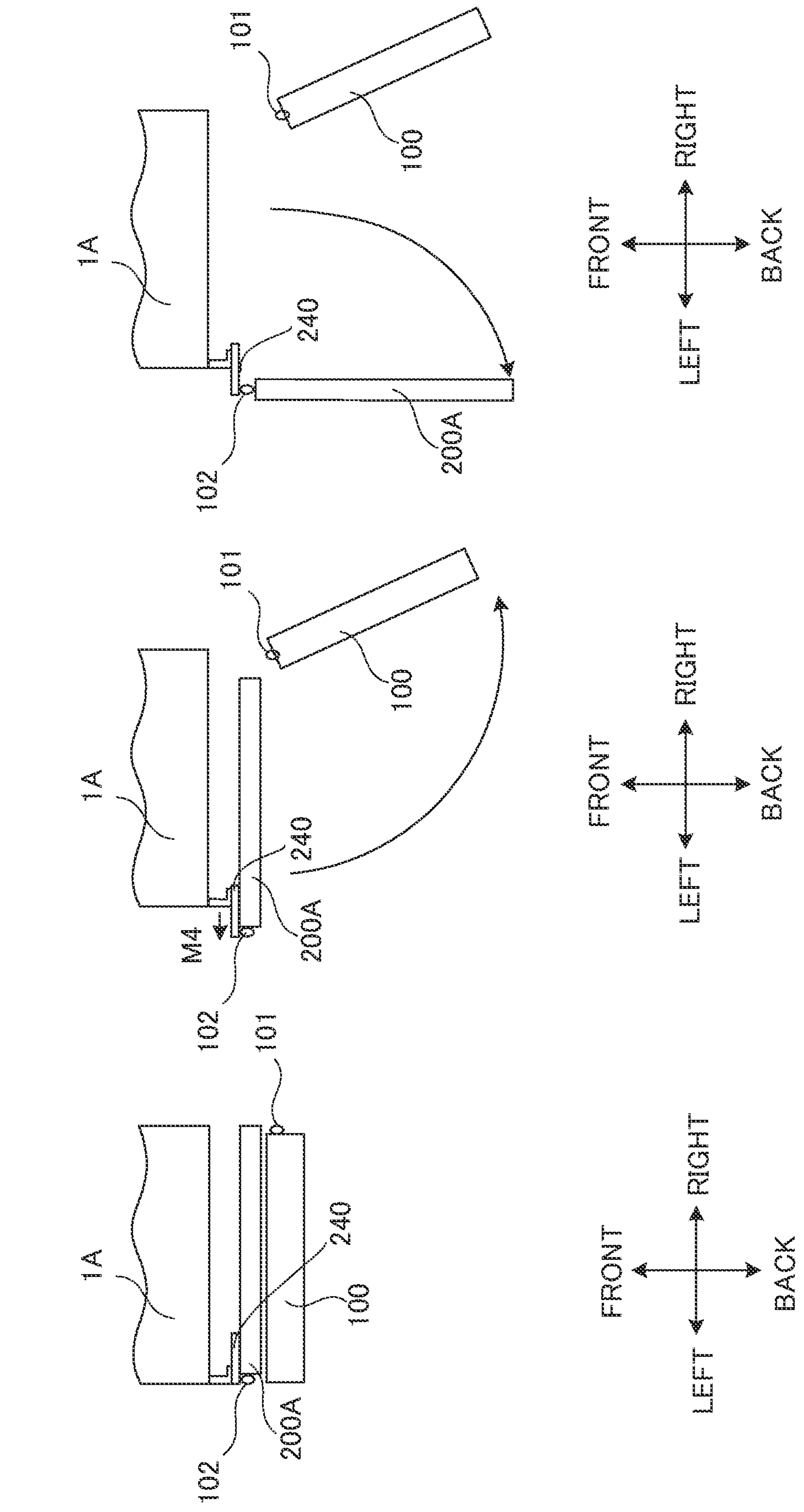
FIG. 14A is a top view illustrating a slide member before movement according to a third embodiment.
FIG. 14B is a top view illustrating the slide member during movement according to the third embodiment.
FIG. 14C is a top view illustrating the slide member after movement according to the third embodiment.

Next, a third embodiment in which a device controller unit 200A can pivot without being obstructed by the first pivot shaft 101 will be described with reference to FIGS. 14A to 14C. As illustrated in FIG. 14A, in the third embodiment, a slide member 240 capable of moving the device controller unit 200A closed with respect to the casing 1A in the right-left direction while maintaining the closed state is provided. The slide member 240 serving as a moving member at least retains the device controller unit 200A together with the second pivot shaft 102.

As illustrated in FIG. 14B, the slide member 240 is disposed slidably in the right-left direction with respect to the casing 1A, and by the slide movement thereof (e.g., in the direction indicated by arrow M4), the device controller unit 200A is moved in sliding motion in the right-left direction while maintaining the closed state with respect to the casing 1A. Thereby, the right end portion of the device controller unit 200A is moved to a position not overlapped with the projection of the first pivot shaft 101. Thus, the right end portion of the second support plate 205*b* is moved to a position not overlapped with the projection of the first pivot shaft 101, such that as illustrated in FIG. 14C, the device controller unit 200A can pivot greatly about the second pivot shaft 102 without being obstructed by the first pivot shaft 101.

Figure 16:
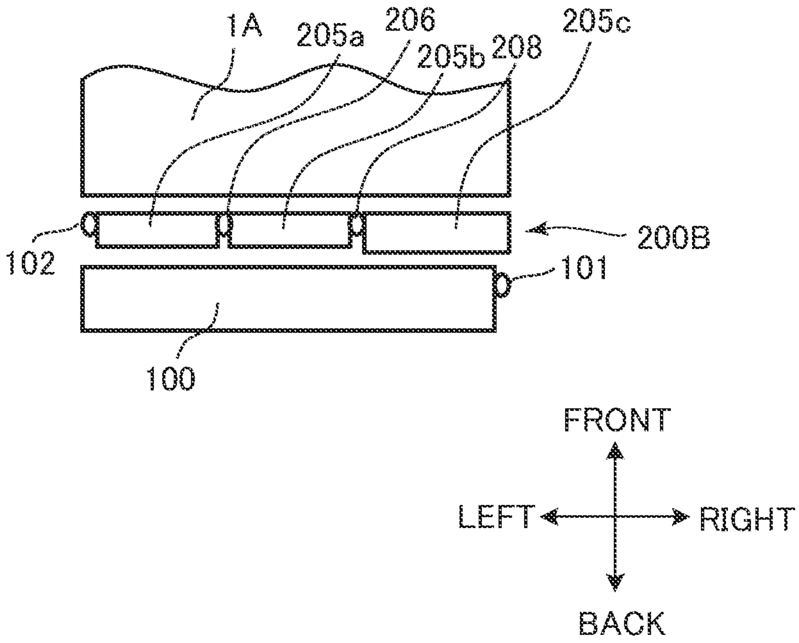
FIG. 16 is a top view illustrating a device controller unit having three pivot shafts.

According further to the first embodiment described above, an example has been illustrated in which the device controller unit 200 is equipped with the second pivot shaft 102 and the third pivot shaft 206 such that the pivoting of the device controller unit 200 is not obstructed by the first pivot shaft 101 (refer to FIG. 8), but the present technique is not limited thereto. For example, as illustrated in FIG. 16, the device controller unit 200B can include a board support plate 205 that is divided into a first support plate 205*a*, a second support plate 205*b*, and a third support plate 205*c*, with a third pivot shaft 206 and a fourth pivot shaft 208 arranged therebetween. That is, compared to the device controller unit 200 of the first embodiment, regarding a right-left direction, the device controller unit 200B includes the fourth pivot shaft 208 arranged approximately in parallel with the third pivot shaft 206 on an opposite side as the third pivot shaft 206 on the second support plate 205*b*, and the third support plate 205*c* that pivots with respect to the second support plate 205*b* about the fourth pivot shaft 208.

When opening the device controller unit 200B, the first support plate 205*a* pivots to the back side about the second pivot shaft 102, while the second support plate 205*b* pivots about the third pivot shaft 206 in a manner such that its pivoting end is folded toward the inner side with respect to the first support plate 205*a*. Further, the third support plate 205*c* pivots about the fourth pivot shaft 208 in a manner such that its pivoting end is folded toward the back side with respect to the second support plate 205*b*. Thereby, the right end portion of the third support plate 205*c* is moved to a position not overlapped with the projection of the first pivot shaft 101. Thus, since the right end portion of the third support plate 205*c* is moved to a position not overlapped with the projection of the first pivot shaft 101, the device controller unit 200B is opened by being pivoted greatly about the second pivot shaft 102 without being obstructed by the first pivot shaft 101.

Figure 15:
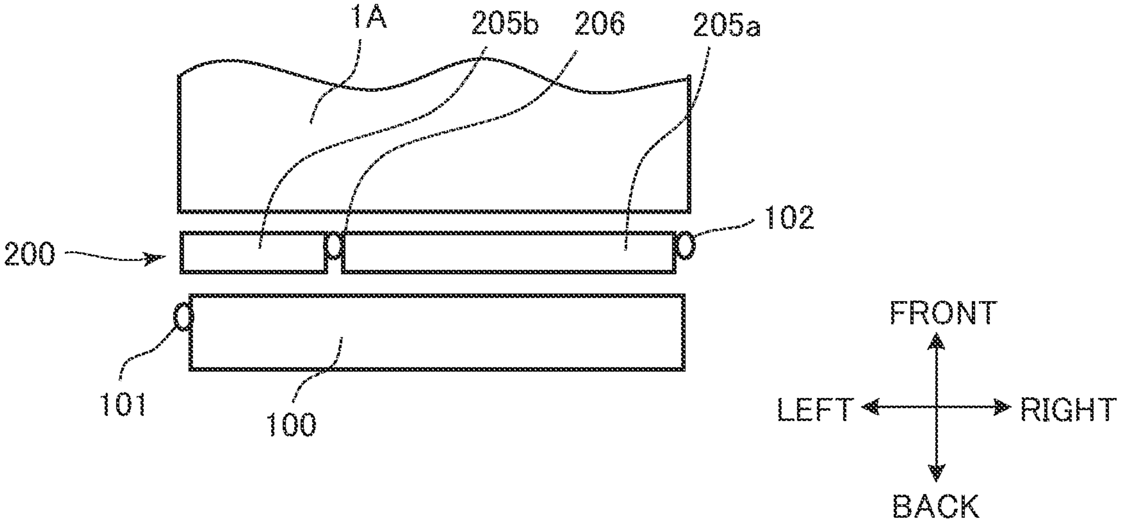
FIG. 15 is a top view illustrating a device controller unit in a state where a pivot shaft is arranged on a right in a back side.

In the embodiment described above, a configuration has been illustrated in which the second pivot shaft 102 of the device controller unit 200 is arranged on the left side and the first pivot shaft 101 of the controller box unit 100 is arranged on the right side, but the present technique is not limited thereto. For example, as illustrated in FIG. 15, a configuration can be adopted in which the second pivot shaft 102 of the device controller unit 200 is arranged on the right side and the first pivot shaft 101 of the controller box unit 100 is arranged on the left side. According to such a configuration, if the sheet discharge direction of the recording material S is the right direction, the connector portions (207*a* and 207*b*, refer to FIG. 8) described above are arranged on the side having the second pivot shaft 102 of the device controller unit 200. Meanwhile, if the sheet discharge direction of the recording material S is the left direction, the connector portions (207*a* and 207*b*) are arranged on the left end portion of the device controller unit 200 opposite to the second pivot shaft 102. Thereby, electrical connection of the connector portions with postprocessing apparatuses connected downstream in the sheet discharge direction of the recording material S can be performed easily.

Figure 17:
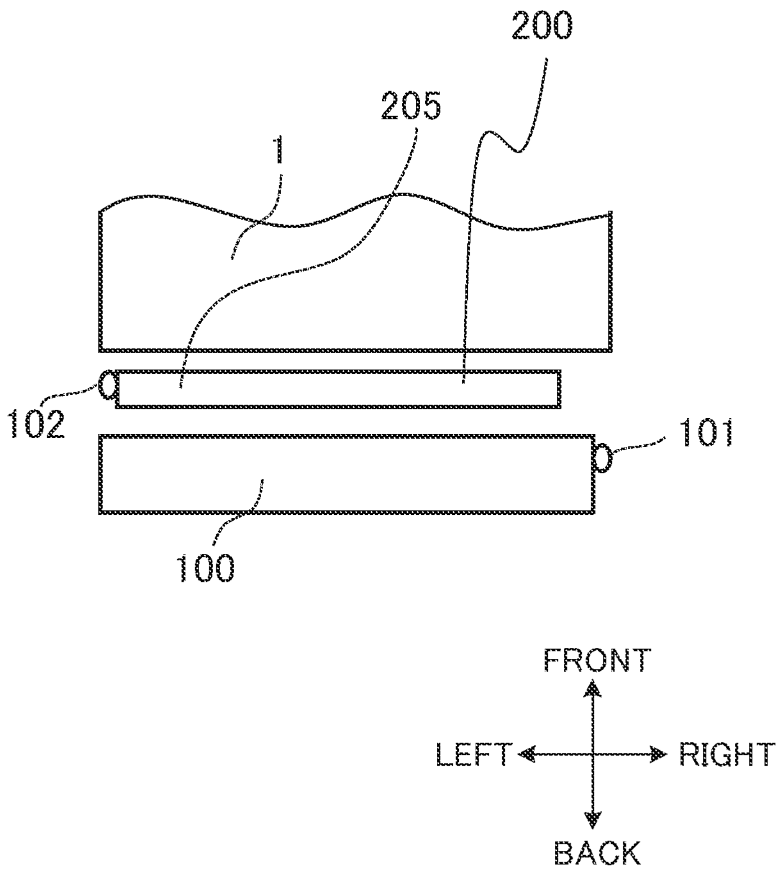
FIG. 17 is a top view illustrating the device controller unit having one pivot shaft.

The device controller unit 200 can be positioned such that the pivoting end of the device controller unit 200 in the closed state is positioned further toward the left than the first pivot shaft 101 of the controller box unit 100 when arranged in a layered manner with the controller box unit 100. This configuration is illustrated in FIG. 17. As illustrated in FIG. 17, if the pivoting end of the device controller unit 200 is at a position not overlapped with the first pivot shaft 101, the pivoting of the device controller unit 200 about the second pivot shaft 102 will not be obstructed by the first pivot shaft 101. Therefore, in that case, it is not necessary to adopt a configuration of pivoting the device controller unit 200 without being obstructed by the first pivot shaft 101, as illustrated in the respective embodiments described above. According to the embodiment illustrated in FIG. 17, the board support plate 205 is composed of a single plate, and on the board support plate 205 are disposed, although not shown, the device controller 201, the charging high-voltage boards (202 and 203), and the connector portions (207*a* and 207*b*). As described, by adopting a pivotable configuration for the controller box unit 100 and the device controller unit 200, the operator can perform maintenance of the drive unit that is arranged on a depth side of the device controller unit 200.

According further to the above-mentioned embodiments, the image forming apparatus 1 adopts the intermediate transfer system in which the image forming units SY, SM, SC, and SK for forming yellow, magenta, cyan, and black toner images are arranged facing the intermediate transfer belt 7, but the present technique is not limited thereto. For example, the image forming apparatus 1 can adopt an inkjet recording system in which images are formed to the sheet by discharging ink through nozzles in the image forming unit. In that case, the image forming unit of the inkjet recording system can adopt a thermal system in which ink drops are discharge through nozzles by a heater drive system, or a piezo system in which ink drops are discharged through nozzles by piezoelectric elements. Even according to such cases, only the system of the image forming units SY, SM, SC, and SK is changed to the inkjet recording system, and the back side configuration of the image forming apparatus 1, that is, the configuration of the controller box unit 100 and the device controller unit 200, is configured similarly as the embodiments described above. Thereby, even in a case where the inkjet recording system is adopted as the image forming unit, the operator can access the drive units hidden behind the device controller unit 200 without any trouble by simply pivoting the controller box unit 100 and the device controller unit 200. Accordingly, the workability of the operator on the drive units can be improved in a case where the drive units are arranged deeper than the electric component boards of the system controller 111 and the device controller 201 adopting a layered configuration.

Image Forming System

Figure 18:
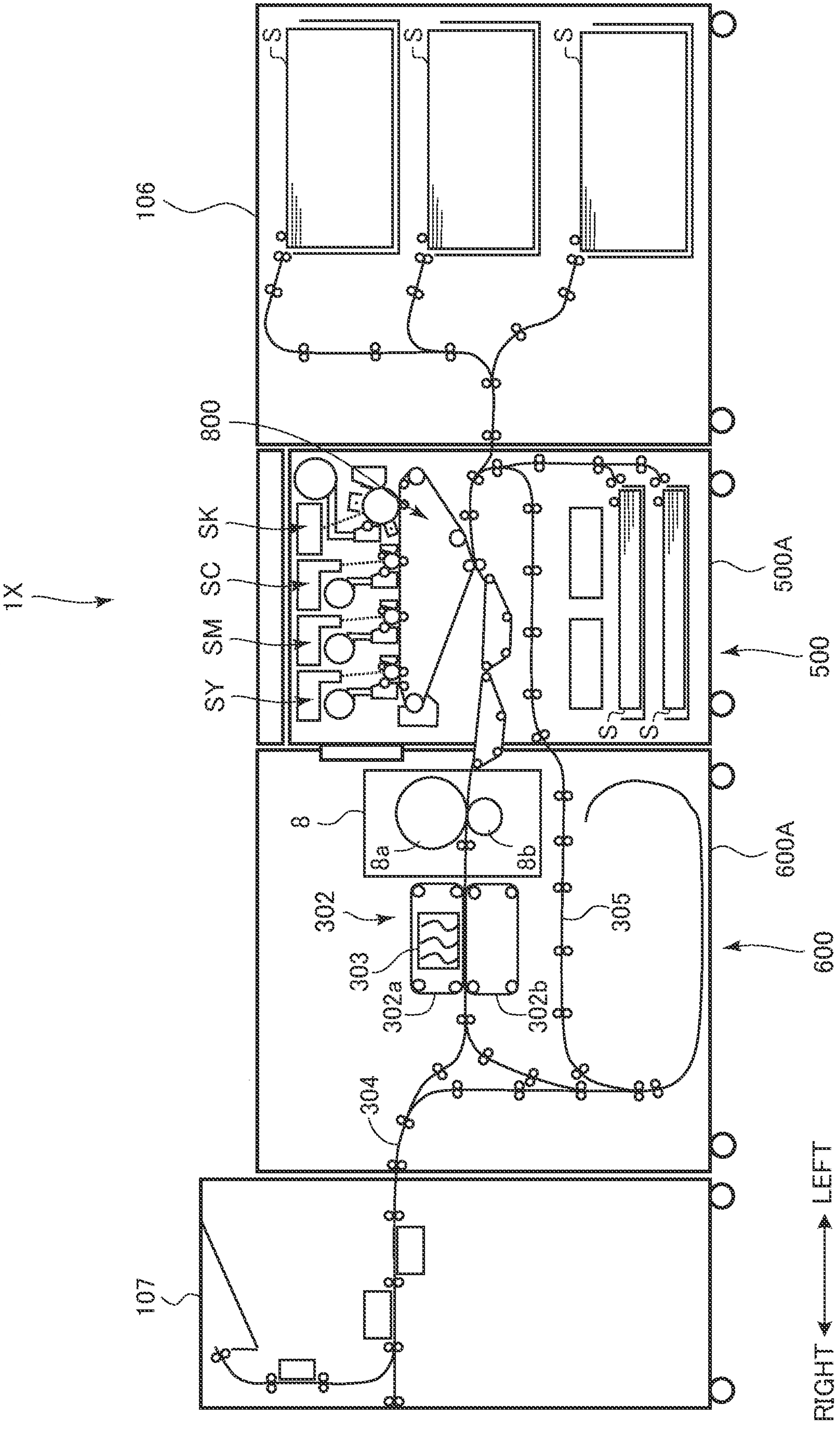
FIG. 18 is a schematic drawing illustrating one example of an image forming system including the image forming apparatus according to the present embodiment.

The respective embodiments described above adopt a configuration in which the finisher unit 150 is provided on the image forming apparatus 1, and electrical connection with the finisher unit 150 is realized through the connector portions (207*a* and 207*b*). The respective embodiments mentioned above can be adopted in image forming systems of other configurations. FIG. 18 illustrates an image forming system 1X adopting an image forming apparatus 500.

In the image forming system 1X, compared to the image forming apparatus 1 described above, the image forming units SY to SK and the intermediate transfer belt unit 800 (refer to FIG. 1) that realize the image forming process leading to a transferring step for transferring the toner image to the recording material S is stored in a casing 500A of the image forming apparatus 500. The fixing unit 8 is stored in a casing 600A of a fixing and conveying apparatus 600 disposed as a separate member as the image forming apparatus 500. That is, the fixing and conveying apparatus 600 storing the fixing unit 8 is connected to the image forming apparatus 500 in a manner capable of passing the recording material S thereto. The image forming apparatus 500 and the fixing and conveying apparatus 600 respectively have the casing 500A and the casing 600A that are independent, each apparatus capable of being moved by a plurality of casters provided respectively thereto. Thereby, even if the image forming apparatus 500 and the fixing and conveying apparatus 600 are large-scale apparatuses, packaging and shipping thereof can be performed for each of the casing 500A and the casing 600A in a separated state, such that the workability leading to installation is improved. As for the configuration of the image forming apparatus 500, it is approximately the same as the configuration of the fixing and conveying apparatus 600 except for the fact that it has no fixing unit 8 and that it has a conveyance path of the recording material S that leads to the fixing and conveying apparatus 600, so that the descriptions thereof are omitted.

Furthermore, the image forming system 1X illustrated in FIG. 18 includes a large-capacity sheet feeder 106 including a plurality of sheet storage portions, and a sensing apparatus 107. The large-capacity sheet feeder 106 is an apparatus that feeds the recording material S to the image forming apparatus 500. The sensing apparatus 107 is an apparatus that reads the toner image that has been formed and fixed to one side or on both sides of the recording material S, and performs feedback to the image forming apparatus 500 as image signals. According to the image forming apparatus 500, image density and image position deviation are detected based on the image signal subjected to feedback, and based on the detected image density and image position deviation, the image data is corrected. Then, based on the corrected image data, the image forming units SY to SK are controlled to form toner images on the recording material S. Regarding the conveyance direction (which is from left to right) of the recording material S by the large-capacity sheet feeder 106, the fixing and conveying apparatus 600 and the sensing apparatus 107 are arranged downstream of the image forming apparatus 500.

The fixing and conveying apparatus 600 will be described. The fixing and conveying apparatus 600 includes the fixing unit 8 and a cooling unit 302. The fixing unit 8 includes a heating roller 8*a* heated by a heater not shown, and a pressure roller 8*b* pressing the recording material S against the heating roller 8*a*. The recording material S conveyed from the image forming apparatus 500 on which the toner image is formed is nipped and conveyed while being heated and pressed by a fixing nip formed by the heating roller 8*a* and the pressure roller 8*b*. Thereby, the toner image is fixed to the recording material S. The present example illustrates the fixing unit 8 composed of a pair of rollers, which are the heating roller 8*a* and the pressure roller 8*b*, but the present technique is not limited thereto. For example, a fixing belt can be provided instead of the heating roller 8*a*, and the recording material S can be nipped and conveyed while being heated and pressed by a fixing nip formed of the fixing belt heated by a heater and the pressure roller 8*b*, by which a toner image is fixed to the recording material S.

The recording material S heated by the fixing unit 8 is cooled by the cooling unit 302, and thereafter, discharged toward the sensing apparatus 107 described above. The cooling unit 302 includes conveyance belts 302*a* and 302*b*, and a heat sink 303. The conveyance belts 302*a* and 302*b* abut against one another to nip and convey the recording material S. The heat sink 303 is arranged in contact with an inner circumference surface of the conveyance belt 302*a*, and the heat sink 303 cools the conveyance belt 302*a*. Thereby, the recording material S heated by the fixing unit 8 is cooled while being nipped and conveyed by the conveyance belts 302*a* and 302*b*. Then, the recording material S passes through a sheet discharge conveyance path 304 and discharged from the casing 600A toward the sensing apparatus 107. Further according to the recording material S having the toner image fixed to one side in the duplex printing mode, the sheet is conveyed to a reconveyance path 305 without being discharged from the casing 600A, and returned to the image forming apparatus 500.

According to such image forming system 1X, the controller box unit 100 and the device controller unit 200 described above are arranged on the back side of the casing 500A of the image forming apparatus 500. Then, the image forming apparatus 500 is electrically connected to the fixing and conveying apparatus 600 by the connector portion 207*a* arranged on the upper side in the vertical direction of the connector portions 207*a* and 207*b* (refer to FIG. 8) disposed on the device controller unit 200, and electrical connection with the sensing apparatus 107 is performed by the connector portion 207*b* disposed on the lower side in the vertical direction.

Figure 19:
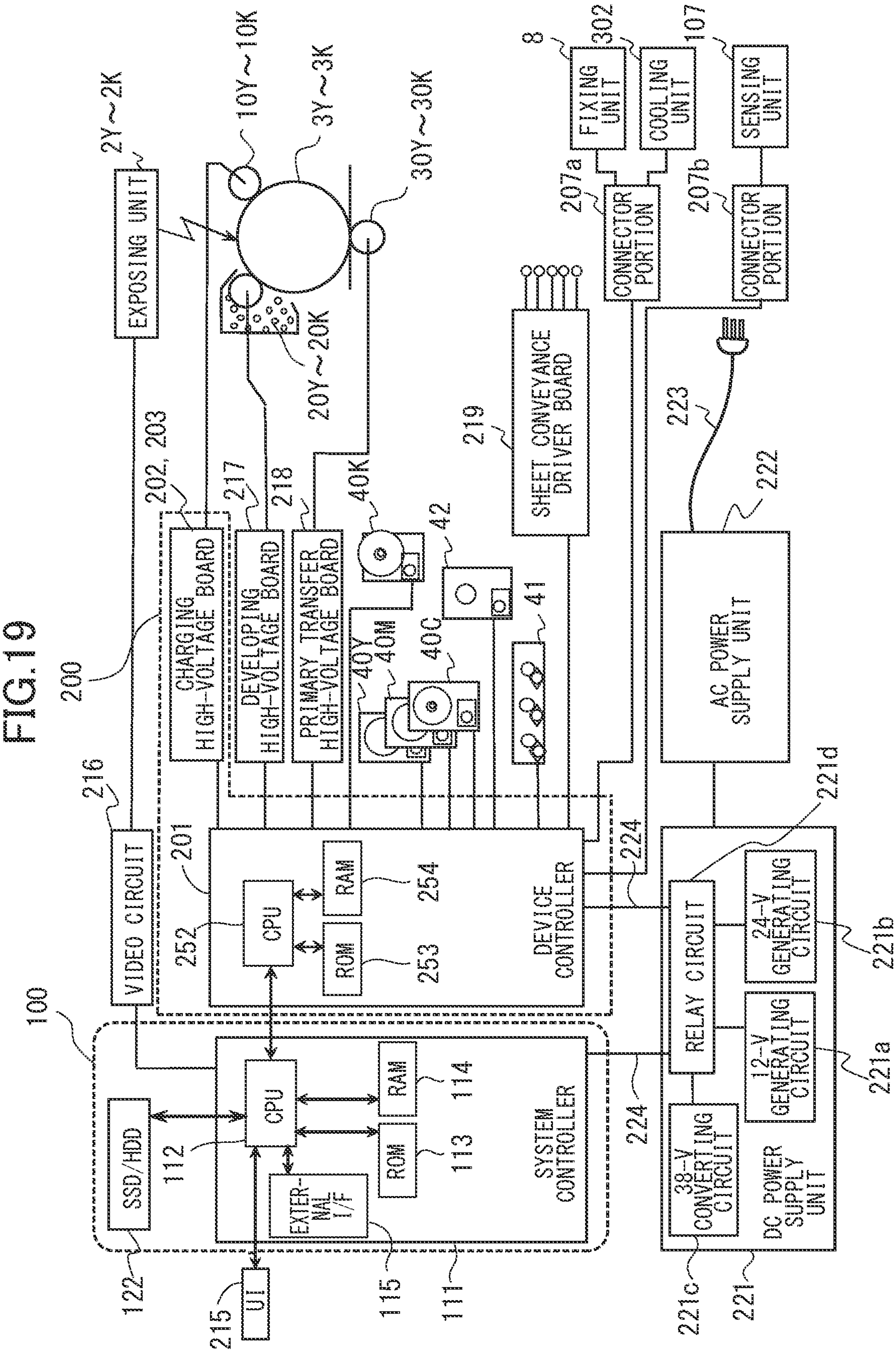
FIG. 19 is a block diagram illustrating a control system of the image forming system.

FIG. 19 illustrates a block diagram of a control system of the image forming system 1X described above. Configurations similar to the control system of the first embodiment described above (refer to FIG. 2) is denoted with the same reference numbers, and descriptions thereof are simplified or omitted. The device controller 201 is connected by signal wires through the connector portion 207*a* with the fixing unit 8, the cooling unit 302 and various conveyance rollers of the fixing and conveying apparatus 600. That is, the device controller 201 performs control of the fixing unit 8 and the cooling unit 302 and control of rotation of various conveyance rollers.

Further, the device controller 201 is connected by signal wires through the connector portion 207*b* with the sensing apparatus 107. The image signal of toner image read by the sensing apparatus 107 is entered through the device controller 201 to the system controller 111. Further, the sensing apparatus 107 and the system controller 111 can be directly connected through signal wires.

Further, the fixing and conveying apparatus 600 can be equipped with a power supply unit that is independent from the image forming apparatus 500. In that case, the fixing unit 8 and the cooling unit 302 are connected by power supply wires with the power supply unit and supplied of voltage within the casing 600A of the fixing and conveying apparatus 600. However, since conveyance control of the recording material S is performed integrally by the device controller 201, the signal wire for control is connected to the device controller 201.

Even in the image forming system 1X in which the processing apparatuses such as the fixing and conveying apparatus 600 and the sensing apparatus 107 are connected to the image forming apparatus 500, the respective embodiments described above can be adopted. Thereby, the workability of the operator on the drive units is improved in a case where the drive units are arranged on the depth side than the electric components boards including the system controller 111 and the device controller 201 arranged in a layered manner.

Further, although not shown, one or a plurality of postprocessing apparatuses such as an inserter, a puncher, a case bookbinding apparatus, a large-capacity stacker, a folder, a finisher, and a trimmer can be selectively connected in a combined manner further downstream of the fixing and conveying apparatus 600 or the sensing apparatus 107. As described, by allowing a large variety of optional devices to be selectively connected upstream and downstream of the image forming apparatus 500, the image forming system 1X having superior productivity, image quality, stability and functions capable of outputting products subjected to various types of postprocessing treatments inline for a large variety of materials can be provided.

According to the present invention, in a configuration in which the first electric component board and the second electric component board are arranged in a layered configuration, the workability of the operator on the drive unit arranged deeper in the casing than these electric component boards can be improved.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-012865, filed Jan. 31, 2022, which is hereby incorporated by reference herein in its entirety.

What is claimed is:

1. An image forming apparatus that forms an image on a recording material, comprising:

a frame body;

an image forming unit contained in the frame body and configured to form an image on a recording material;

a first electric component unit arranged on a back side of the image forming apparatus, and configured to switch between an opened state and a closed state with respect to the frame body;

a first electric component board configured to communicate with an external apparatus, the first electric component board being mounted to the first electric component unit;

a second electric component unit arranged on the back side of the image forming apparatus, and configured to switch between an opened state and a closed state with respect to the frame body, and a second electric component board configured to communicate with the first electric component board and control the image forming unit, the second electric component board being mounted to the second electric component unit, wherein the first electric component unit is configured to pivot about a first pivot axis positioned on a first side in a width direction of the image forming apparatus, the first pivot axis extending in a direction intersecting with the width direction and a front-back direction of the image forming apparatus, wherein the second electric component unit is configured to pivot about a second pivot axis positioned on a second side different from the first side in the width direction of the image forming apparatus, the second pivot axis extending in the direction intersecting with the width direction and the front-back direction, and wherein, in a state where the first electric component unit and the second electric component unit are in the closed states, the second electric component unit is positioned between the first electric component unit and the image forming unit in the front-back direction of the image forming apparatus.

2. The image forming apparatus according to claim 1, wherein the image forming unit includes a photosensitive drum, and a drive unit including a drive motor configured to rotate the photosensitive drum, the drive unit configured to be exposed by opening the first electric component unit and the second electric component unit.

3. The image forming apparatus according to claim 1, wherein the image forming unit includes a photosensitive drum, and a charging unit configured to charge the photosensitive drum, and wherein the second electric component board includes a charging high-voltage board, and a device controller board configured to control the charging high-voltage board.

4. The image forming apparatus according to claim 3, wherein the second electric component unit adopts a two-axis pivot structure including a first plate portion retaining a first board, and a second plate portion disposed pivotably with respect to the first plate portion and retaining a second board that differs from the first board.

5. The image forming apparatus according to claim 4, wherein a connector configured to communicate with a postprocessing apparatus is provided on the first side in the width direction of the second electric component unit in a state where the second electric component unit is in the closed state.

6. The image forming apparatus according to claim 1, wherein the image forming unit further includes a developing apparatus, and wherein the second electric component board is connected to a developing high-voltage board configured to generate a high voltage used in the developing apparatus.

7. The image forming apparatus according to claim 1, wherein the image forming unit further includes a transfer apparatus, and wherein the second electric component board is connected to a transfer high-voltage board configured to generate a high voltage used in the transfer apparatus.

8. The image forming apparatus according to claim 1, wherein the image forming unit adopts an inkjet recording system.

9. The image forming apparatus according to claim 1, wherein in the front-back direction of the image forming apparatus, the second pivot axis of the second electric component unit is positioned toward a front side than the first pivot axis of the first electric component unit.

10. The image forming apparatus according to claim 1, wherein, in a state where the first electric component unit and the second electric component unit are in the closed states, the first electric component board faces the second electric component board.

11. The image forming apparatus according to claim 1, wherein the image forming unit includes a photosensitive drum, and a charging unit configured to charge the photosensitive drum, wherein the second electric component unit includes a charging high-voltage board configured to generate a high voltage used in the charging unit, a first support plate on which the charging high-voltage board is attached, and a second support plate on which the second electric component board is attached, and wherein the first support plate is configured to pivot about the second pivot axis and the second support plate is configured to pivot about a third pivot axis.

12. The image forming apparatus according to claim 11, wherein the third pivot axis extends in a direction intersecting with the width direction and the front-back direction of the image forming apparatus.

* * * * *